United States Patent [19]
Furuta

[11] Patent Number: 5,890,078
[45] Date of Patent: Mar. 30, 1999

[54] SYNTHETIC CONTROL SYSTEM FOR AUTOMOBILE

[75] Inventor: Akira Furuta, Tokyo, Japan

[73] Assignee: Mitsubishi Denki Kabushiki Kaisha, Tokyo, Japan

[21] Appl. No.: 639,802

[22] Filed: Apr. 29, 1996

[30]     Foreign Application Priority Data

Nov. 30, 1995  [JP]  Japan ................................. 7-312833

[51] Int. Cl.$^6$ ................................................. B60R 16/02
[52] U.S. Cl. ................................. 701/1; 701/36; 701/48; 701/104
[58] Field of Search ................................. 701/1, 36, 48, 701/103, 104, 105, 111; 123/406, 416, 417

[56]           References Cited

U.S. PATENT DOCUMENTS

| | | | |
|---|---|---|---|
| 4,954,957 | 9/1990 | Kawagoe et al. | 701/48 |
| 5,032,997 | 7/1991 | Kawagoe | 701/48 |
| 5,084,821 | 1/1992 | Ohsuga et al. | 701/48 |
| 5,189,617 | 2/1993 | Shiraishi | 701/48 |
| 5,369,581 | 11/1994 | Ohsuga et al. | 701/48 |
| 5,369,584 | 11/1994 | Kajiwara | 701/48 |
| 5,513,107 | 4/1996 | Gormley | 701/48 |
| 5,699,250 | 12/1997 | Kobayashi | 701/1 |

FOREIGN PATENT DOCUMENTS 795659  4/1995  Japan .

*Primary Examiner*—Gary Chin
*Attorney, Agent, or Firm*—Sughrue, Mion, Zinn, Macpeak & Seas, PLLC

[57]                ABSTRACT

A synthetic automobile control system in which influence of a time lag or delay can be suppressed to a possible minimum without impairing the ease of system expansion of automobile systems includes an arithmetic mechanism (301) incorporating a microcomputer (301C) for arithmetically determining control quantities, a driving mechanism (302) for driving a plurality of actuators (105) in accordance with corresponding control quantities, respectively, and an interface mechanism (103) for coupling the arithmetic mechanism (301) and the driving mechanism (302) to each other. The actuator (105) includes at least one of a fuel injector (1051) and an ignition unit (1053) provided in association with each of engine cylinders. The control quantities include at least one of a fuel injection quantity and an ignition timing. The variety of sensor signals derived from the sensors (104) are inputted to the arithmetic mechanism (301), while the microcomputer (301C) incorporated in the arithmetic mechanism (301) is comprised of an input signal processing mechanism for performing input processing for the sensor signals.

13 Claims, 22 Drawing Sheets

SYNTHETIC CONTROL SYSTEM FOR AUTOMOBILE

BACKGROUND OF THE INVENTION

1. Field of the Invention

The present invention relates to a synthetic or overall control system or apparatus which can be applied to a diversified or sophisticated motor vehicle or automobile system. More particularly, the invention is concerned with a synthetic automobile control system which has flexibility or is expandable in application for a plurality of different types of automobiles for synthetic control thereof with high efficiency and improved performance.

2. Description of Related Art

Electronic control apparatuses developed heretofore for application to motor vehicle systems or automobile systems, include an engine control apparatus, an automatic transmission (AT) control apparatus, a constant-speed cruising control apparatus and so forth. In this conjunction, it should however be noted that these control apparatuses are designed for controlling various actuators of the automobile independent of one another.

Consequently, the various control apparatuses mentioned above require respective sensors (such as rotation speed or RPM sensor, a water temperature sensor, a throttle opening degree detecting sensor and others) for arithmetically determining corresponding control quantities on the basis of various sensor output signals indicating operation states of the automobile, to thereby operate or drive the associated actuators such as a throttle actuator, an ignition unit, an automatic transmission (AT) speed-shift solenoid, a fuel injector and others.

In recent years, however, a trend has arisen for developing a synthetic automobile control system which allows data transfer or communication to be effected freely among different arithmetic control units and actuator driving units incorporated in an automobile system with a view to realizing synthetically enhanced or sophisticated control thereof. As a typical example of this sort of synthetic automobile control system, there may be mentioned, by way of example, a system disclosed in Japanese Unexamined Patent Application Publication No. 95659/1995 (JP-A-7-95659).

The synthetic control system described in the publication mentioned above is composed of an input/output unit for processing a plurality of sensor signals and for driving a plurality of actuators, an arithmetic unit for performing arithmetic operations or processes in accordance with the control data for the individual actuators on the basis of the various sensor signals, and an interface means for coupling the arithmetic unit with the input/output unit, for realizing flexible and easy adaptation to the automobile systems which become diversified or more and more sophisticated.

For a better understanding of the present invention, a description will first be made in some detail of the background technique.

FIG. 28 is a schematic diagram showing a major portion of a conventional synthetic automobile control system known heretofore such as disclosed in Japanese Unexamined Patent Application Publication No. 95659/1995 JP-A-7-95659 on the presumption that a single or an integrated input/output means is provided, and FIG. 29 is a schematic diagram showing another conventional synthetic automobile control system in which an input unit and an output unit are provided separately from each other.

Now, referring to FIG. 28, an input/output unit 102 constituting an input/output means is connected to sensors 104 and actuators 105 and is capable of processing a plurality of input/output signals (sensor signals and actuator driving signals).

On the other hand, an arithmetic unit 101 constituting an arithmetic means performs arithmetic operations involved in controlling an automobile by using the input signals supplied from the sensors 104 after having been processed by the input/output unit 102 to thereby control the actuators 105 via the input/output unit 102. On the other hand, an interface means 103 is constituted by a multiplex communication means for interconnecting the arithmetic unit 101 and the input/output unit 102 with each other through the medium of multiplex communication channels or equipment.

On the other hand, in the system in FIG. 29, an input unit 202 constituting an input means is connected to a plurality of sensors 104 and adapted to process the input signals supplied from the individual sensors 104, while an output unit 203 constituting an output means is connected to actuators 105 and adapted to drive a plurality of actuators 105 on the basis of control quantities determined by the arithmetic unit 101.

More specifically, the arithmetic unit 101 is so programmed as to execute arithmetic operations for controlling the automobile system by using the sensor signals processed by the input unit 202 to thereby drive the actuators 105 via the output unit 203 in accordance with data resulting from the arithmetic operations. The interface means 103 constituted by a multiplex communication means connects the arithmetic unit 101 with the input unit 202 and the output unit 203 by utilizing a multiplex communication facility provided by the interface means 103.

As is apparent from the foregoing, in the case of the synthetic automobile control system known heretofore, the arithmetic means (i.e., the arithmetic unit 101), the input/output processing means (i.e., the input/output unit 102 or the input unit 202 and the output unit 203) are provided independently from one another and interconnected via the interface means 103.

Thus, for a diversity of automobile systems, the input/output signal processing (performed by the input/output unit 102 or the input unit 202 and the output unit 203) and the arithmetic processing (performed by the arithmetic unit 101) can be realized with high efficiency by using one input/output unit 102 or a plurality of input/output processing means (i.e., the input unit 202 and the output unit 203) together with the arithmetic means (i.e., the arithmetic unit 101).

In this conjunction, it is noted that the standardized input/output means (i.e., the input/output unit 102 or the input unit 202 and the output unit 203) is implemented in such a structure as to be capable of performing a plurality of input/output processings.

Accordingly, even when an automobile system which requires a large number of input/output processings, there arises substantially no need for increasing excessively amount of hardware. Besides, in the state where the hardware parts are disposed physically close to one another, it is possible to perform the input/output operations for the sensor signals and the actuator driving signals with high efficiency while sparing wire harnesses.

Next, the description will turn to an ignition control operation of the conventional synthetic automobile control system.

FIG. 30 is a timing chart for illustrating an ignition timing control operation of the arithmetic unit 101 and the input/ output unit 102 implemented in an integrated structure and having a knock (or knocking) suppressing function. In the figure, a pulse signal Ne is one of various sensor signals outputted from the sensors 104 and represents an engine rotation number or speed (rpm).

A crank angle $\alpha°$ indicated by the pulse signal Ne may be set at an angular position preceding to a top dead center by 80° (this crank angle position will be referred to as the crank angle position BTDC 80°, while a crank angle $\beta°$ may be set, for example, at a position preceding to the top dead center by 10° (also referred to as the crank angle position BTDC 10°). Further, a main period $T_0$ represents a period of a main processing routine executed by the arithmetic unit 101.

More specifically, there are illustrated in FIG. 30 relations among a timing for arithmetically determining a basic ignition timing, a knock correcting timing determined through an interrupt processing executed at every crank angle $\alpha°$ indicated by the pulse signal Ne and a power transistor driving signal D2 for an ignition-dedicated power transistor included in the actuators 105.

Through the main processing routine executed by the arithmetic unit 101, the basic ignition timing is arithmetically determined at a timing $t_b$ during every main period $T_0$, while a knock correcting quantity is arithmetically determined at every timing $t_c$ corresponding to every crank angle $\alpha°$ indicated by the pulse signal Ne.

The knock correcting processing (i.e., the ignition-dedicated power transistor driving processing) is executed at a timing $t_k$ corresponding to the crank angle $\alpha°$ indicated by the pulse signal Ne. In other words, the basic ignition timing is corrected by the knock correcting quantity determined arithmetically at the timing $t_c$ corresponding to the crank angle $\alpha°$ in the preceding main period, whereby the ignition-dedicated power transistor is driven at the corrected basic ignition timing.

In this manner, when the ignition timing is arithmetically determined, the arithmetic unit 101 performs knock correction at the timing $t_k$ corresponding to the crank angle $\alpha°$ indicated by the pulse signal Ne to thereby send out the ignition timing data to the input/output unit 102. In that case, because the knock correction processing is executed at every pulse ($\alpha°$) of the pulse signal Ne, a lag or delay in the transmission of the ignition timing data will exert an adverse influence on the ignition control which should intrinsically be performed without any appreciable delay.

Besides, in the conventional synthetic automobile control system of the structure in which the output circuit for driving the actuators 105 and the input circuit for processing the sensor signals from the sensors 104 are incorporated in one and the same input/output unit 102 which constitutes the input/output processing means, as shown in FIG. 28, a great difficulty will be encountered in coping with cross-talk noise between the output circuit and the input circuit. In other words, influence of noise superposed on the intrinsic signals can not be eliminated, giving rise to a problem. Additionally, when a fault occurs in the arithmetic unit 101 or the interface means 103, there arises a serious problem that the control system as a whole is rendered inoperative.

On the other hand, in the case of the synthetic automobile control system equipped with a plurality of input/output processing means, the problem of cross-talk noise between the input unit 202 and the output unit 203 can certainly be mitigated because they are provided discretely or independent of each other. However, when a fault takes place in the arithmetic unit 101, the interface means 103 or the input unit 202, there will undesirably arise a great possibility that the whole control system will become impotent in carrying out the control operations as required, involving another problem.

Additionally, in the synthetic automobile control system shown in FIG. 28 (or FIG. 29), the actuators 105 are driven through the multiplex communication effectuated by the interface means 103 interposed between the arithmetic unit 101 and the input/output unit 102 (or between the arithmetic unit, the input unit 202 and the output unit 203). Thus, there is required signal transmission from the input/output unit 102 (or input unit 202) to the arithmetic unit 101 and data transmission from the arithmetic unit 101 to the input/output unit 102 (or the output unit 203), which means that a time lag due to the bidirectional communication is no more negligible. Besides, the possibility of the occurrence of a communication error will increase, to another disadvantage. In particular, when the data to be processed at a highest rate or instantaneously, such as the data for the ignition control, is transferred through the communication, a time lag involved in the communication provides a great obstacle to the ignition control, incurring a very serious problem.

Furthermore, when the ignition timing is controlled for the purpose of suppressing the knock event, the knock correcting timing is validated at every crank angle $\alpha°$. Consequently, a time lag occurs in the communication, affecting adversely the ignition control which requires instantaneous effectuation without any appreciable delay.

SUMMARY OF THE INVENTION

In the light of the state of the art described above, it is an object of the present invention to provide a synthetic control system for motor vehicles or automobiles in which problems of the conventional synthetic automobile control system are successfully solved.

In particular, it is another object of the present invention to provide an improved synthetic automobile control system in which influence of the time lag or delay mentioned previously can be suppressed to a possible minimum without impairing the ease of the expansion of automobile system.

In view of the above and other objects which will become apparent as the description proceeds, there is provided according to an aspect of the present invention, a synthetic control system for an automobile, which system includes a plurality of actuators for operating/driving an automobile, a plurality of sensors for generating a variety of sensor signals indicating operation states of the automobile, an arithmetic means including a microcomputer for arithmetically determining control quantities for the plurality of actuators on the basis of the variety of sensor signals, a driving means for driving the plurality of actuators in accordance with the control quantities, respectively, and an interface means for coupling the arithmetic means and the driving means to each other. The actuator includes at least one of a fuel injector and an ignition unit provided in association with each of engine cylinders of an internal combustion engine of the automobile. The control quantities include at least one of fuel injection quantity and ignition timing for each of the engine cylinders. The driving means is adapted for driving at least one of the fuel injector and the ignition unit on the basis of the relevant control quantity. The variety of sensor signals are inputted to the arithmetic means, while the microcomputer incorporated in the arithmetic means includes an input signal processing means for performing input processing for the variety of sensor signals.

With the arrangement of the synthetic automobile control system described above, the sensor signals are inputted directly or straightforwardly to the arithmetic means through the input/output processing means, whereby the arithmetic means performing arithmetic operations for controlling operations of the automobile system can be separated from the driving means for driving the various actuators. Thus, the diversified automobile system can be implemented with high efficiency and effectiveness with the influence of the time lag or delay ascribable to the communication, being suppressed to a possible minimum. Besides, influences of noise and heat can easily be mitigated or eliminated.

In a preferred mode for carrying out the invention, the interface means may be constituted by multiplex communication means, wherein the arithmetic means transmits the control quantities to the driving means by using the multiplex communication means, while the driving means controls operation of the actuator in response to a reception interrupt by the multiplex communication means.

By adopting the multiplex communication means as the interface means in this manner, the automobile system can be expanded easily.

In another preferred mode for carrying out the invention, the driving means may be so adapted as to drive the fuel injector in precedence to the transmission of a signal indicative of the fuel injection quantity and intercept operation of the fuel injector in response to the reception interrupt of the fuel injection quantity signal sent from the arithmetic means.

In yet another preferred mode for carrying out the invention, the arithmetic means may include a means for arithmetically determining a basic ignition timing for the ignition timing through a main processing routine executed periodically at a predetermined time interval, a means for detecting occurrence of knock in an internal combustion engine of the automobile, and a means for arithmetically determining a knock correcting quantity for correcting the ignition timing in response to detection of the knock through an interrupt processing routine. A corrected ignition timing obtained by correcting the basic ignition timing with the knock correcting quantity may be transmitted to the driving means as the control quantity every time the basic ignition timing is arithmetically determined, while a corrected ignition timing obtained by correcting the basic ignition timing by the knock correcting quantity may be sent to the driving means as the control quantity every time the knock correcting quantity is arithmetically determined.

With the arrangement described above, the ignition timing corrected at every arithmetic determination of the basic ignition timing and at every arithmetic determination of the knock correcting quantity is sent out, whereby delay involved in the transfer or communication of the data for the ignition control requiring instantaneous effectuation as possible can be reduced to a minimum.

In still another preferred mode for carrying out the invention, the driving means may be so arranged as to control operation of the fuel injector by using a fuel injection quantity supplied in precedence or last from the arithmetic means unless the fuel injection quantity has been sent from the arithmetic means over a predetermined time period.

Owing to the arrangement described above, the fuel injection control can be carried out even when the corresponding command is not issued from the arithmetic means.

In a further preferred mode for carrying out the invention, such arrangement may be adopted that a minimum number of these sensor signals of the variety of sensor signals which are required for driving a minimum number of actuators required for operating and driving the automobile at least are inputted to the driving means. In the case, the driving means may incorporate a microcomputer which includes a fault detecting means for detecting occurrence of a fault in at least one of the arithmetic means and the interface means, an input processing means for performing input processing of the necessary minimum number of required sensor signals upon detection of the fault, and an arithmetic processing means for arithmetically determining control quantities for the minimum number of required actuators on the basis of the minimum number of required sensor signals.

By virtue of the arrangement described above, at least those of the actuators which are indispensably required for the operation of the automobile system can be driven on the basis of a minimum number of the sensor signals required to this end at the least. Thus, it is possible to drive the automobile only by means of the driving means, while protecting the automobile system against becoming inoperative or shutdown.

In a yet further preferred mode for carrying out the invention, the variety of sensors may include a throttle position sensor for detecting a position of a throttle valve of the automobile, an accelerator pedal position sensor for detecting a position of an accelerator pedal of the automobile, a rotation speed sensor for detecting a rotation speed (rpm) of the internal combustion engine of the automobile, and a crank angle sensor provided in association with each of the engine cylinders. The variety of sensor signals may then be comprised of a throttle position detection signal generated by the throttle position sensor, an accelerator pedal position signal generated by the accelerator pedal position sensor, a pulse signal generated by the rotation speed sensor in synchronism with rotation of the internal combustion engine, and a cylinder identifying signal generated by the crank angle sensor. Thus, the minimum number of required sensor signals may include the throttle position detection signal, the accelerator pedal position detection signal, the pulse signal and the cylinder identifying signal.

In still further preferred mode for carrying out the invention, the fault detecting means may include a means for generating watchdog data from the output of the arithmetic means, a means for comparing the watchdog data to be inputted to the driving means with a preceding value, and a means for deciding a fault of the arithmetic means when a state in which result of comparison of the current value of the watchdog data with the preceding value thereof is abnormal continues over a predetermined fault decision time period.

For carrying out the invention, the fault detecting means may include a means for deciding occurrence of a fault in the interface means when data inputted from the arithmetic means to the driving means through the interface means has not been obtained over a predetermined fault decision time period.

Further, the actuator may include an automatic transmission (AT) speed-shift solenoid. The arithmetic means may then be so arranged as to determine arithmetically a control quantity for the automatic transmission (AT) speed-shift solenoid while performing the input processing for the sensor signals for controlling the automatic transmission. The driving means may then be so adapted as to drive the automatic transmission (AT) speed-shift solenoid on the basis of the control quantity sent from the arithmetic means while setting a speed shift stage of the automatic transmission substantially at a middle speed upon occurrence of a fault in at least one of the arithmetic means and the interface means.

Owing to the arrangement of the synthetic automobile control system described above, adaptability of the system for automobile operating conditions can be expanded, whereby the driving or running function of the automobile can be ensured at least to a necessary minimum in the worst case.

Moreover, the driving means may be so arranged as to arithmetically determine the fuel injection quantity as the control quantity on the basis of the pulse signal and the throttle position detection signal when a fault is detected in at least one of the arithmetic means and the interface means, to thereby control operation of the fuel injector at an input timing of the pulse signal on the basis of the fuel injection quantity while controlling operation of the ignition unit in synchronism with the pulse signal.

Furthermore, the actuator may include a throttle actuator for controlling an intake air flow of the internal combustion engine with an electric signal. The arithmetic means determines arithmetically a desired opening degree of the throttle valve as the control quantity. The driving means may be so arranged as to drive the throttle actuator on the basis of the desired opening degree supplied from the arithmetic means while arithmetically determining the desired opening degree of the throttle valve on the basis of the throttle position detection signal and the accelerator pedal position detection signal, to thereby drive the throttle actuator when a fault is detected in at least one of the arithmetic means and the interface means.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
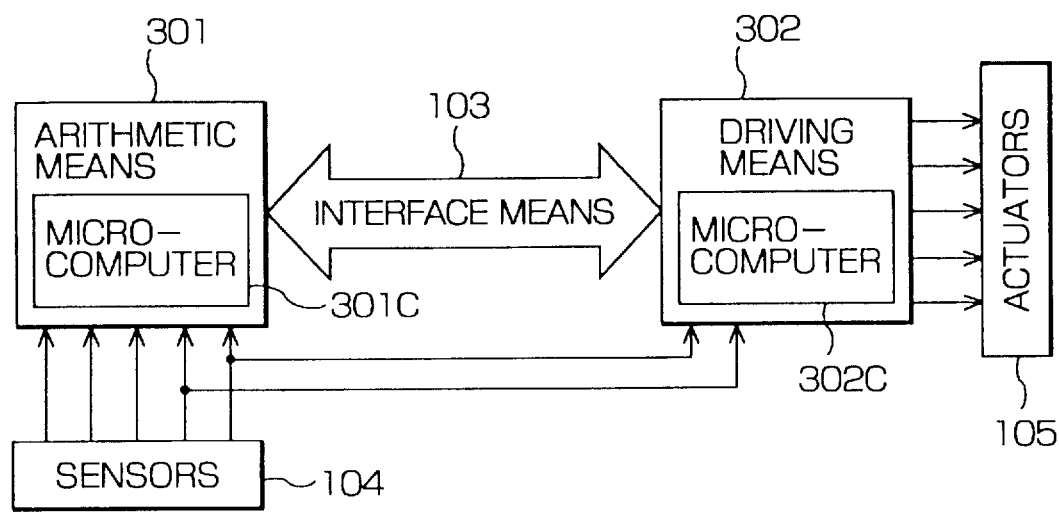
FIG. 1 is a functional block diagram showing schematically a major portion of a synthetic automobile control system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a functional block diagram showing a major portion of a synthetic automobile control system according to a first embodiment of the present invention.

Referring to the figure, an arithmetic means 301 including a microcomputer 301C is imparted with a function of input means for processing input signals from a plurality of sensors 104 to thereby execute arithmetic operations for controlling the associated automobile system on the basis of the input information supplied from the sensors 104.

The driving means 302 including the microcomputer 302C drives a plurality of actuators 105 on the basis of the control quantities determined arithmetically by the arithmetic means 301. The arithmetic means 301 and the driving means 302 are coupled to each other for performing bidirectional communication by way of the interface means 103 so that the arithmetic means 301 and the driving means 302 can transfer signals or data to each other.

The driving means 302 includes a fault decision means for deciding occurrence of a fault in the arithmetic means 301 or the interface means 103 and an input signal processing means for processing the input signals at least from a necessary minimum number of sensors 104 upon decision of a fault. Thus, the actuators 105 can be driven only with the driving means 302 by making use of the input signals from the sensors 104 to thereby enable the automobile to run even when a fault occurs in either one of the arithmetic means 301 or the interface means 103.

Figure 2:
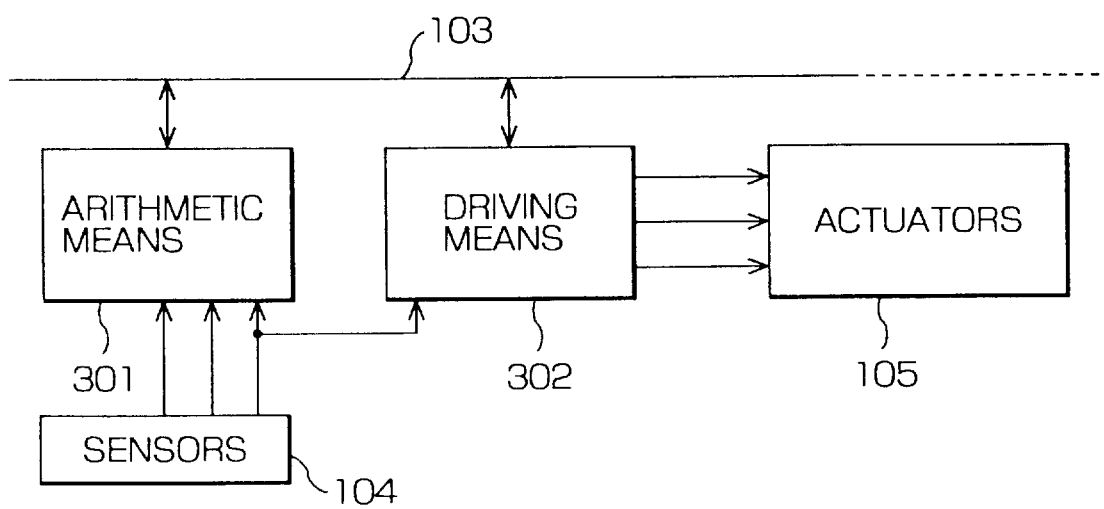
FIG. 2 is a block diagram showing schematically a circuit configuration in the case where a multiplex communication means is employed as an interface means in the system according to the first embodiment of the invention.

FIG. 2 is a block diagram showing a circuit configuration of the interface means 103 incorporated in the synthetic automobile control system shown in FIG. 1, wherein the interface means 103 is implemented by making use of a multiplex communication means such as a local area network (LAN in abbreviation).

By implementing the synthetic automobile control system in such a configuration as shown in FIG. 1, there is no need for providing driving means 302 for driving the actuators 105 and the input means for the arithmetic means 301 for processing the input signals from the sensors 104 in one and the same unit. Accordingly, the measures for coping with influence of noise and heat, as mentioned previously in conjunction with the background technique can be realized easily, which in turn contributes to miniaturization of the unit.

Furthermore, when the arithmetic means 301 or the interface means 103 suffer from a fault, the driving means 302 processes the input signals from those sensors 104 which are required at least for making the automobile to run by allowing the actuators 105 to be driven. Thus, the driving capability of the automobile system can be ensured at least to a necessary minimum without rendering the automobile system to be inoperative.

Further, by employing the multiplex communication means such as a LAN (local area network) as the interface means 103, as shown in FIG. 2, expansion of the automobile system can be much facilitated.

Next, the description will turn to operation of the fault decision means of the synthetic automobile control system according to the instant embodiment of the present invention. In the first place, it should be mentioned that the fault decision mans is realized through cooperation of the arithmetic means 301 incorporated in the arithmetic means 301 and the microcomputer 302C incorporated in the driving means 302.

Figure 3:
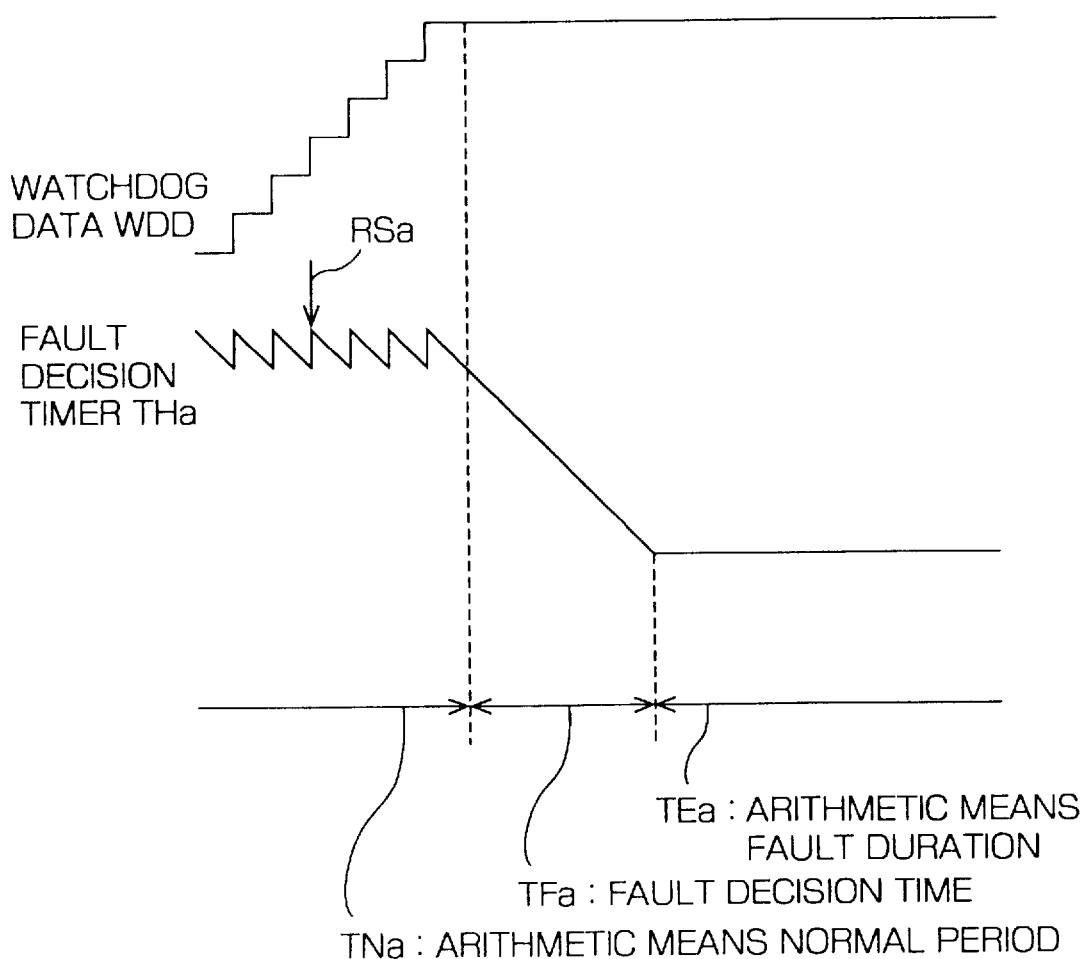
FIG. 3 is a diagram for illustrating a fault decision processing operation of an arithmetic means in the system according to the first embodiment of the invention.
Figure 4:
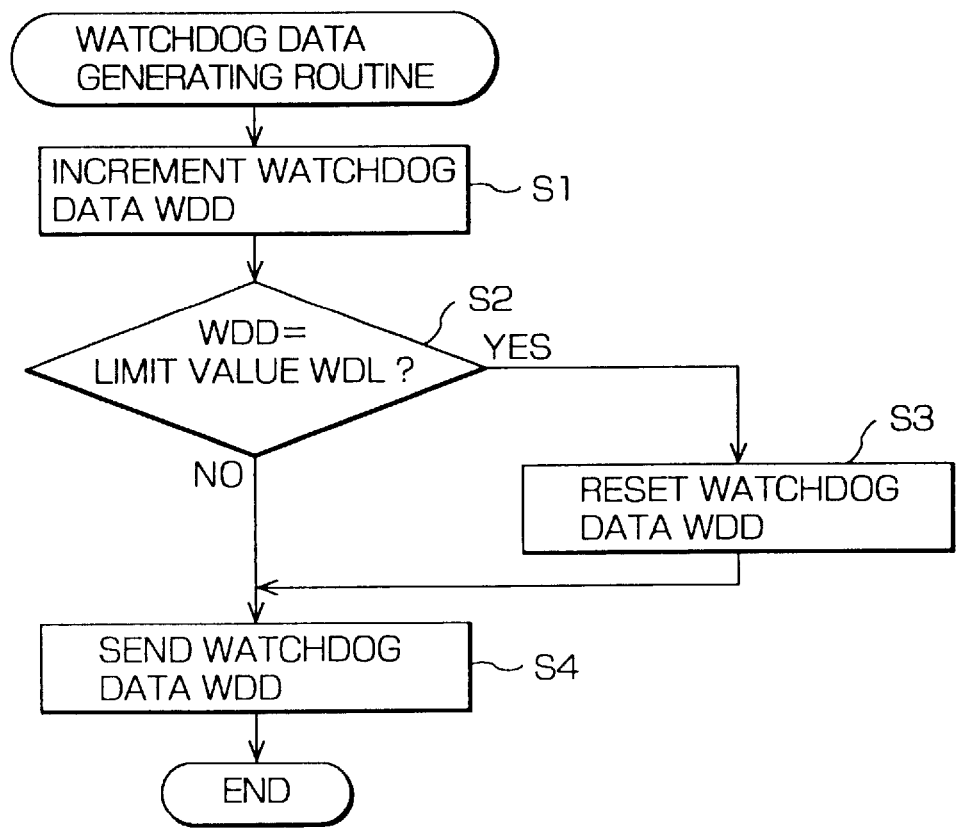
FIG. 4 is a flow chart for illustrating a watchdog data generating routine in a fault detection processing executed by the arithmetic means in the system according to the first embodiment of the invention.
Figure 5:
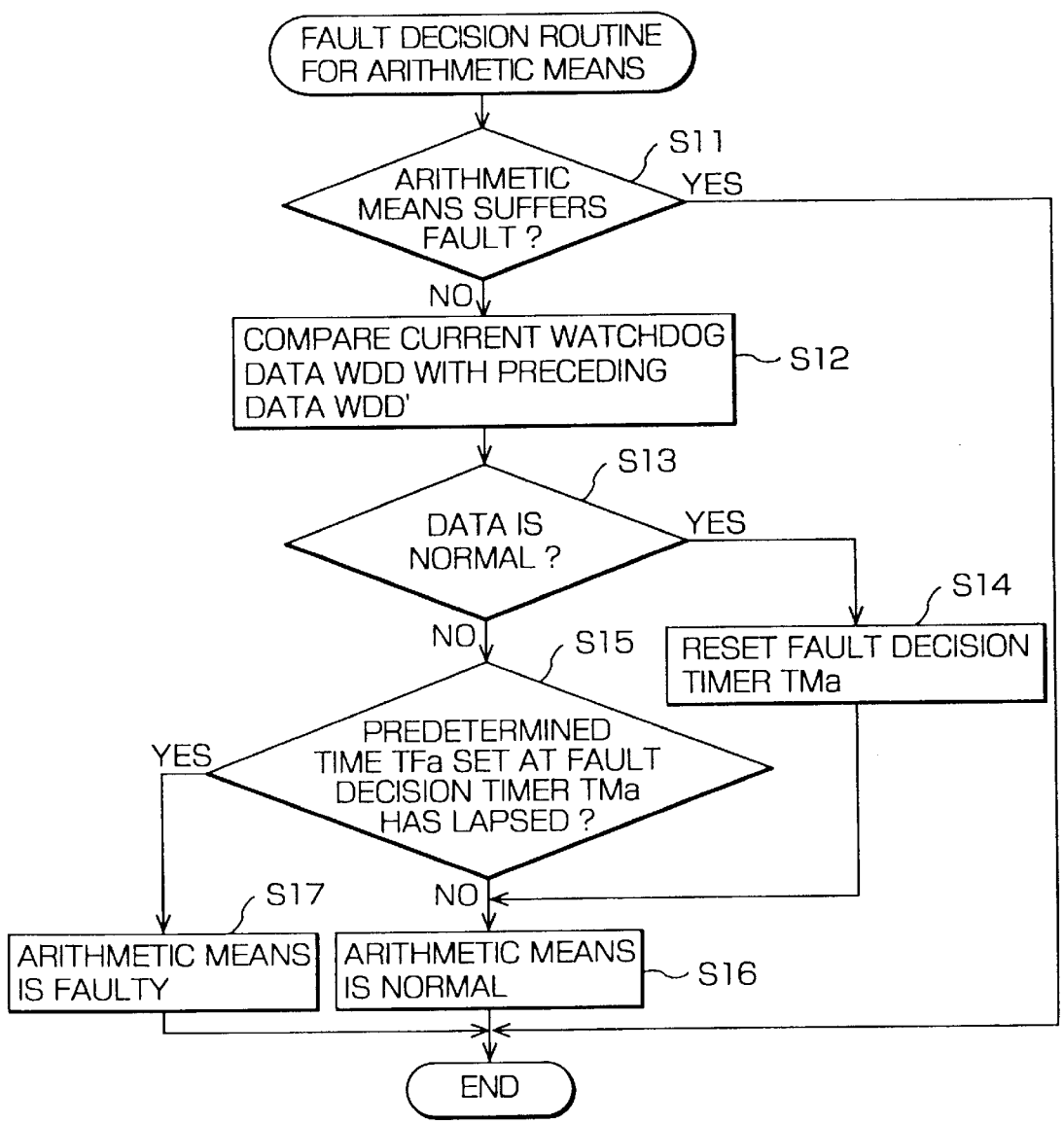
FIG. 5 is a flow chart for illustrating a programmed processing for detecting a fault in the arithmetic means of the system according to the first embodiment of the invention.

At first, a description will be made of operations involved in execution of the fault decision processing executed by the arithmetic means 301 by reference to FIGS. 3 to 5, in which FIG. 3 is a diagram for illustrating a method of detecting a fault in the arithmetic means 301 by the driving means 302, FIG. 4 is a flow chart for illustrating a fault detection processing executed by the arithmetic means 301, and FIG. 5 is a flow chart for illustrating a programmed processing for detecting a fault in the driving means 302.

Referring to FIG. 4, the arithmetic means 301 increments a watchdog data WDD upon every watchdog data generating routine (step S1) for thereby deciding whether or not the watchdog data WDD has reached a limit value WDL (step S2).

When it is decided that the limit value WDL has been reached (i.e., when the output of the step S2 is affirmative or "YES"), the watchdog data WDD is reset (step S3). On the other hand, unless the limit value WDL has been reached (i.e., when the step S2 results in negation or "NO"), the watchdog data WDD as incremented is sent intactly or straightforwardly to the driving means 302 (step S4).

Thus, so long as the arithmetic means 301 operates normally, the watchdog data WDD sent from the arithmetic means 301 is sequentially incremented from the preceding value, while the watchdog data WDD is reset upon every reaching at the limit value WDL.

In FIG. 3, there is shown the state in which a fault occurs in the arithmetic means 301 at a time point indicated by a broken line with the watchdog data WDD remaining at a predetermined value.

Referring to FIG. 5, the driving means 302 determines presence or absence of a fault in the arithmetic means 301 at a current time point (step S11). When it is decided that the arithmetic means 301 is in a normal state (i.e., when the output of the step S11 is "NO"), then the watchdog data WDD sent currently from the arithmetic means 301 is compared with a watchdog data WDD' sent in precedence (step S12) to thereby decide whether the currently furnished watchdog data WDD is normal or not (step S13).

When it is decided that the current watchdog data WDD is incremented within the range of the limit value WDL when compared with the preceding data WDD' and that the current data WDD represents the normal watchdog data (i.e., when the step S13 results in affirmation "YES"), a fault decision timer TMa is reset (see RSa in FIG. 3) in a step S14, whereupon the processing proceeds to a step S16 (described hereinafter). This corresponds to a period TNa during which the arithmetic means 301 is normal, as shown in FIG. 3.

On the other hand, when it is decided in the step S13 that the current watchdog data WDD is not incremented (i.e., the fault decision timer TMa is not reset (RSa) and that the current watchdog data WDD is not normal, (i.e., when the decision step S13 results in "NO"), it is then decided whether a predetermined time (fault decision time) TFa (see FIG. 3) as measured by the fault decision timer TMa (down-counter timer) has lapsed or not in this state (step S15).

When it is decided in the step S15 that the state in which the current watchdog data WDD is not normal has continued for the fault decision time TFa (i.e., when the decision in the step S15 results in "YES"), the decision is made as to the occurrence of a fault in the arithmetic means 301 in an arithmetic means fault duration TEa (see FIG. 3) in a step S17.

On the other hand, when it is decided in the step S15 that the watchdog data WDD has restored a normal value within the fault decision period TFa (i.e., when the result of the step S15 is negative "NO"), the driving means 302 decides that the arithmetic means 301 is normal in a step S16, whereupon the processing routine shown in FIG. 5 comes to an end.

After having reset the fault decision timer TMa in the step S14, the driving means 302 further continues to decide that the arithmetic means 301 is normal (step S16) to terminate the processing routine shown in FIG. 5.

Next, a processing operation for deciding an occurrence of a fault in the interface means 103 will be described concretely.

Figure 6:
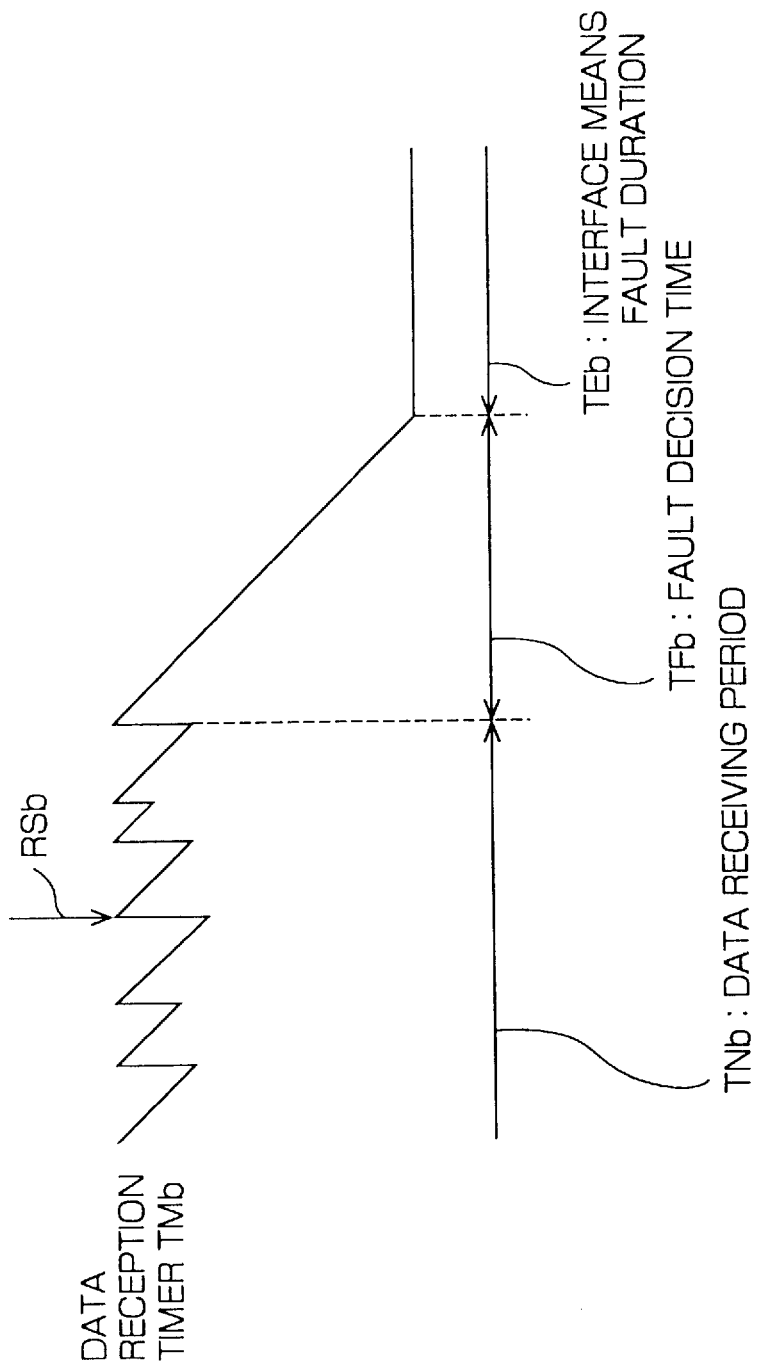
FIG. 6 is a view for illustrating a method for detecting a fault in the interface means.
Figure 7:
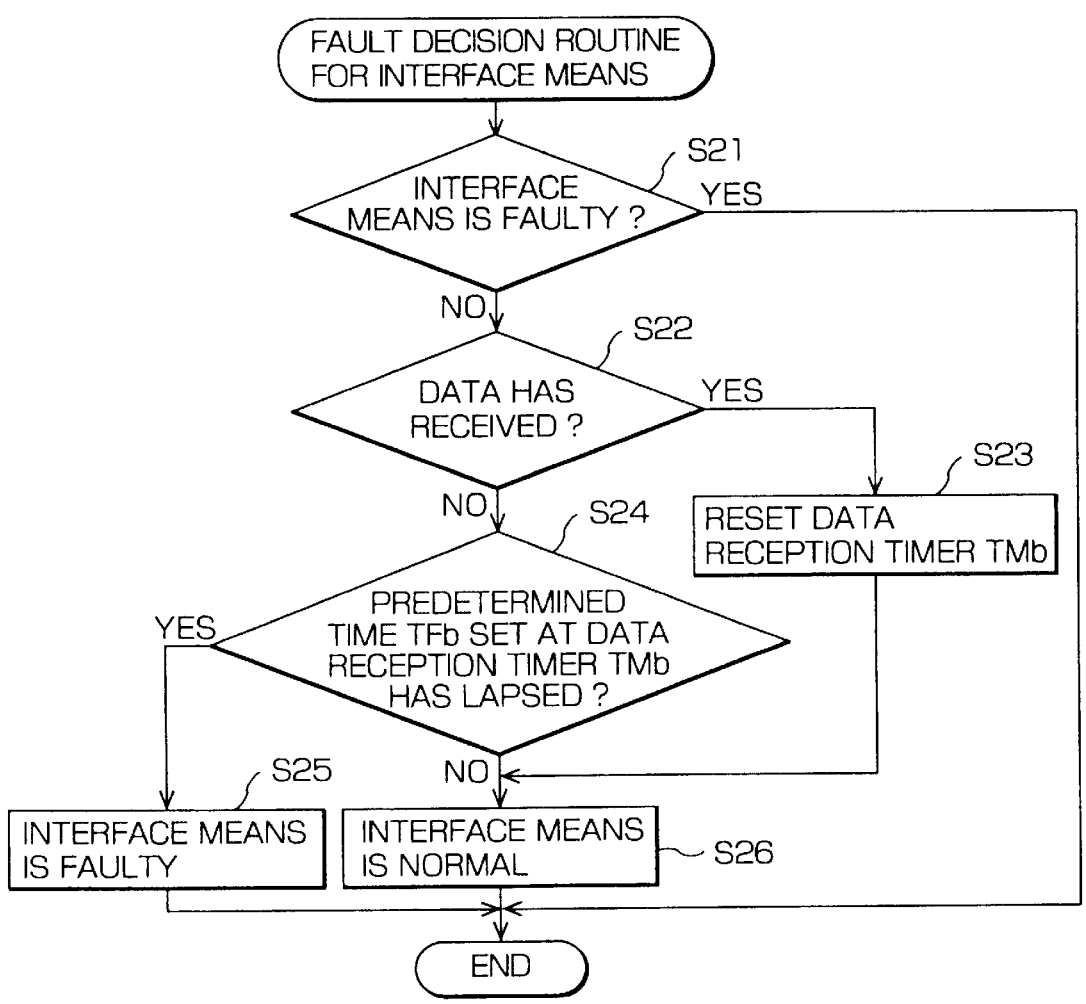
FIG. 7 is a flow chart for illustrating a processing for detecting a fault in the interface means.

FIG. 6 is a view for illustrating a method for detecting a fault in the interface means 103. In this figure, a data reception timer TMb for the interface means 103 corresponds to the fault decision timer TMa mentioned previously. FIG. 7 is a flow chart for illustrating a program processing for detecting a fault in the interface means 103.

Referring to FIG. 7 in combination with FIG. 6, the driving means 302 determines the presence or absence of a fault in the interface means 103 at the current time point (step S21). When it is decided that the interface means 103 is in a normal state (i.e., when the output of the step S21 is "NO"), then it is decided whether the data sent from the interface means 103 has been received or not (step S22).

When it is decided that the data sent out from the interface means 103 has already been received (i.e., when the step S22 results in affirmation "YES"), the data reception timer TMb is reset upon every reception of the data (see RSb in FIG. 6), in a step S23, whereupon the processing proceeds to a step S26 (described hereinafter). This corresponds to a period TNb during which the interface means 103 is normal, that is, a data receiving period, as shown in FIG. 6.

On the other hand, when it is decided in the step S22 that the data is not received (i.e., the data reception timer TMb is not reset (RSb), i.e., when the decision step S22 results in "NO"), it is then decided whether a predetermined time (fault decision time) TFb (see FIG. 6) as measured by the fault decision timer TMb (down-counter timer) in this state has lapsed or not (step S24).

When it is decided in the step S24 that the state in which the data is not received has continued for the fault decision time TFb (i.e., when the decision in the step S24 results in "YES"), a decision is made as to the occurrence of a fault in the interface means 103 in an interface means fault duration TEb (see FIG. 6) in a step S25.

On the other hand, when it is decided in the step S24 that the normal data reception state has been restored within the fault decision time TFb (i.e., when the result of the step S24 is negative "NO"), the driving means 302 decides that the interface means 103 is normal in a step S26, whereupon the processing routine shown in FIG. 7 is terminated.

After having reset the data reception timer TMb in the step S23, the driving means 302 further continues to execute the processing to decide that the arithmetic means 301 is normal (step S26) to terminate the processing routine shown in FIG. 7.

As is apparent from the above description, the driving means 302 can detect a fault in the arithmetic means 301 or the interface means 103 through the processing routine shown in FIG. 5 or FIG. 7.

Next, a description will be made of a backup operation for the driving means 302 upon occurrence of a fault in the arithmetic means 301 or the interface means 103.

Figure 8:
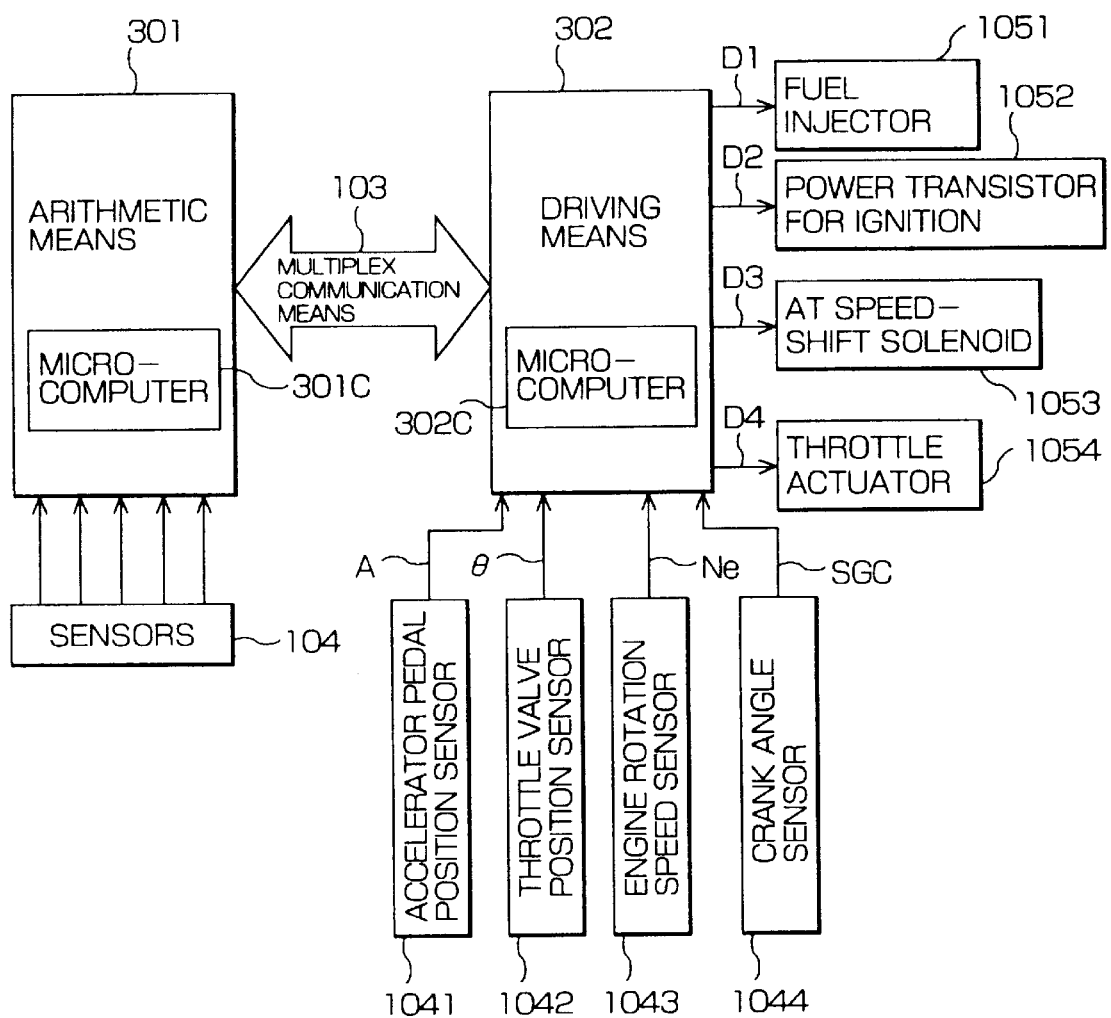
FIG. 8 is a block diagram showing in concrete arrangements of sensors and actuators employed in the system shown in FIG. 1.

FIG. 8 is a block diagram showing in concrete the arrangements of the sensors 104 and the actuators 105 mentioned hereinbefore by reference to FIG. 1, wherein the driving means 302 is so arranged as to ensure a backup function for enabling the automobile to run only with the aid of the driving means 302 when a fault is detected in the arithmetic means 301 or the interface means 103.

As the sensors 104, there are provided an accelerator pedal position sensor 1041 for detecting the position of the accelerator pedal of the automobile, a throttle valve position sensor 1042 for detecting the position of a throttle valve (i.e., throttle opening degree), a rotation speed sensor 1043 for detecting the rotation speed (rpm) of the internal combustion engine, and a crank angle sensor 1044 for detecting a crank angle position of each engine cylinder, wherein various sensor signals outputted from the sensors 104 include an accelerator pedal position detection signal A outputted from the accelerator pedal position sensor 1041, a throttle valve position detection signal θ from the throttle valve position sensor 1042, a pulse signal Ne generated by the rotation speed sensor 1043 in synchronism with the rotation of the engine, and an engine cylinder identifying signal SGC outputted from the crank angle sensor 1044.

The sensor signals inputted to the driving means 302 as the signals which are indispensably required at the least for operating or driving the automobile include the accelerator pedal position detection signal A, the throttle valve position detection signal θ, the pulse signal Ne indicative of the engine rotation speed and the engine cylinder identifying signal SGC.

On the other hand, the actuators 105 driven controllably by the driving means 302, include a fuel injector 1051 provided in association with each of the engine cylinders, an ignition-dedicated power transistor 1052 which constitutes a part of the ignition system, an automatic transmission (AT) speed-shift solenoid 1053 and a throttle actuator 1054 for electrically driving the throttle valve.

Referring to FIG. 8, the arithmetic means 301 is adapted to determine arithmetically or calculate the control quantities on the basis of the input information supplied from the aforementioned various sensors 104, respectively, while the driving means 302 is adapted to drive a plurality of various actuators 105 in accordance with the respective control quantities supplied from the arithmetic means 301. In this conjunction, it is presumed that as the interface means 103 for interconnecting the arithmetic means 301 with the driving means 302, a multiplex communication means 103 is employed.

More specifically, when the microcomputer 302C incorporated in the driving means 302 decides that either one of the arithmetic means 301 or the interface means 103 suffers a fault as a result of the processing operations mentioned previously (FIG. 3 to FIG. 7), then the microcomputer 302C arithmetically determines or calculates the control quantities for the fuel injector 1051, the ignition-dedicated power transistor 1052, the automatic transmission (AT) speed-shift solenoid 1053 and the throttle actuator 1054 on the basis of the accelerator pedal position detection signal A, the throttle valve position detection signal θ, the pulse signal Ne and the engine cylinder identifying signal SGC which are inputted to the driving means 302, to thereby drive the various actuators 1051 to 1054 with the individual driving signals D1 to D4, respectively.

Next, the backup drive control operations of the individual actuators 1051 to 1054, carried out only by means of the driving means 302, will be described in an orderly manner by reference to FIGS. 9 to 16.

Figure 9:
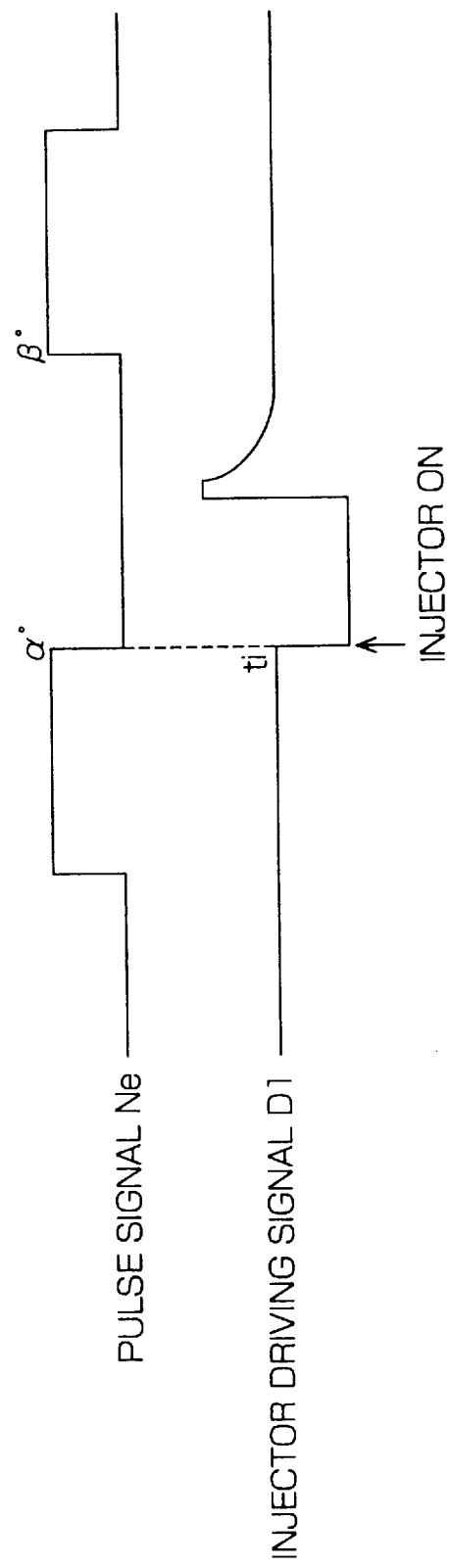
FIG. 9 is a timing chart for illustrating a relation between a pulse signal Ne indicative of an engine rotation speed (rpm) and a fuel injector driving signal.
Figure 10:
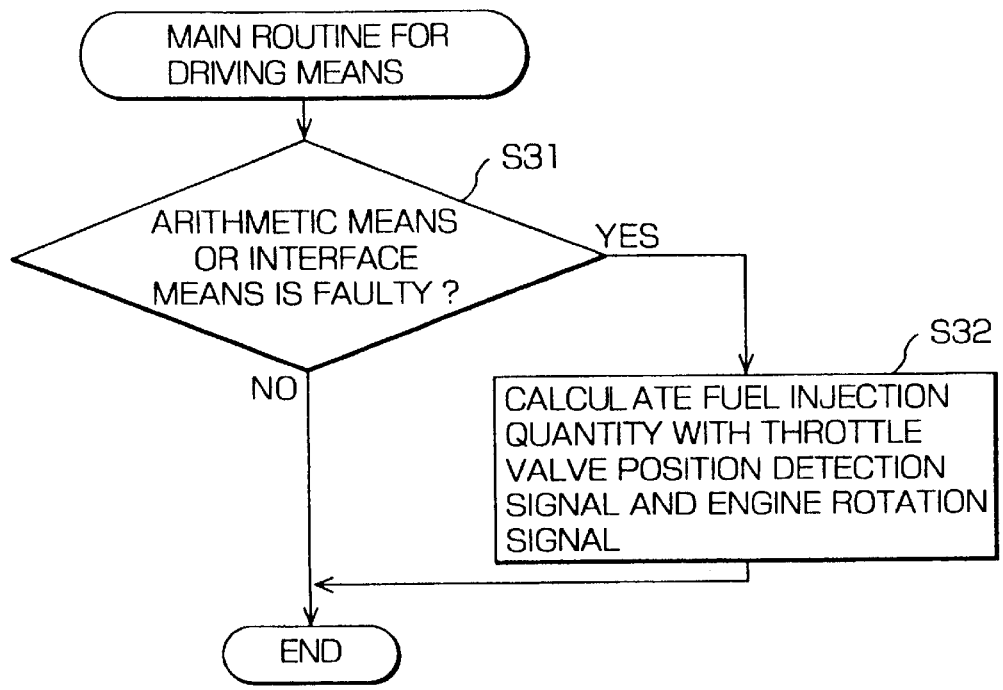
FIG. 10 is a flow chart for illustrating a main processing routine executed by a microcomputer of the driving means.
Figure 11:
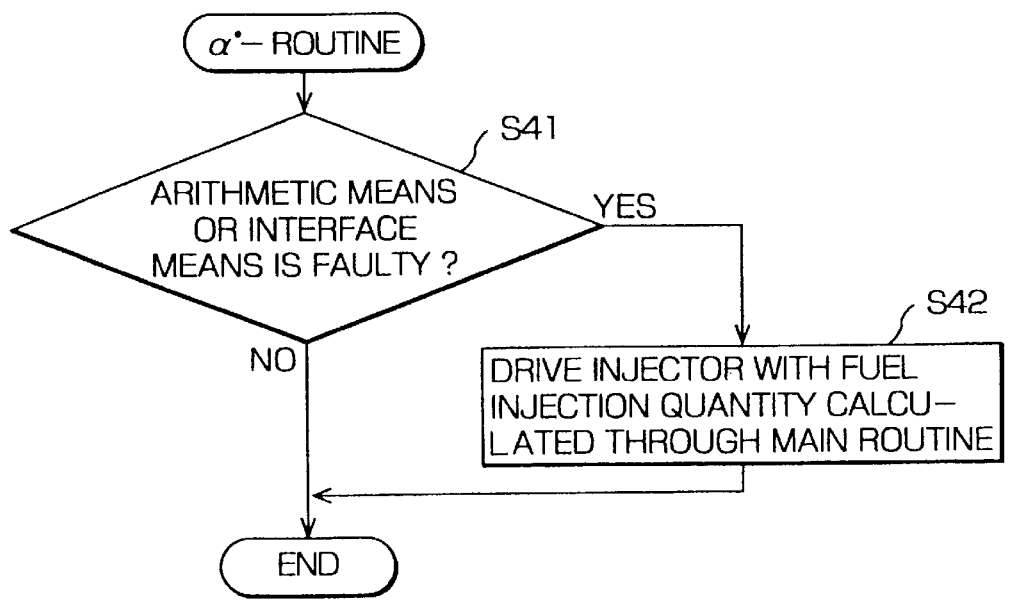
FIG. 11 is a flow chart illustrating an interrupt processing routine executed by the microcomputer of the driving means at every crank angle $\alpha°$ upon decision of occurrence of a fault in the arithmetic means or the interface means.

At first, a description will be directed to the driving control operation for the fuel injector 1051 performed by the driving means 302 upon occurrence of a fault in the arithmetic means 301 or the interface means 103 by reference to FIGS. 9 to 11.

In the drawings mentioned above, FIG. 9 is a timing chart for illustrating a relation between the pulse signal Ne indicative of the engine rotation speed (rpm) and the injector driving signal D1, FIG. 10 is a flow chart for illustrating a main processing routine executed by the microcomputer 302C of the driving means 302, and FIG. 11 is a flow chart illustrating an interrupt processing routine executed by the microcomputer 302C of the driving means 302 at every crank angle α° upon the decision of an occurrence of a fault in the arithmetic means 301 or the interface means 103.

In FIG. 11, a step S41 corresponds to the fault decision step S31 shown in FIG. 10.

Referring to FIG. 10, in the step S31, the driving means 302 makes a decision as to the presence or absence of a fault in the arithmetic means 301 or the interface means 103 by executing the processing described previously by reference to FIGS. 3 to 7. When a decision is made that the arithmetic means 301 or the interface means 103 is normal (i.e., when the result of the step S31 is negative "NO"), the processing now under consideration comes to an end intact. Thus, the fuel injector 1051 is driven in accordance with the corresponding control quantity issued by the arithmetic means 301.

On the other hand, when it is decided in the step S31 that a fault is taking place (i.e., where the step S31 results in affirmation or "YES"), the fuel injection quantity is arithmetically determined in a step S32 on the basis of the throttle valve position detection signal θ and the pulse signal Ne (engine rotation speed signal) inputted to the driving means 302.

Further referring to FIG. 11, every time a fault in the arithmetic means 301 or the interface means 103 is detected (step S41), the driving means 302 drives the fuel injector 1051 in a step S42 in accordance with the fuel injection quantity calculated in the step S32 of the main routine at a timing $t_i$ corresponding to the crank angle α° determined on the basis of the pulse signal Ne (refer to FIG. 9).

Figure 12:
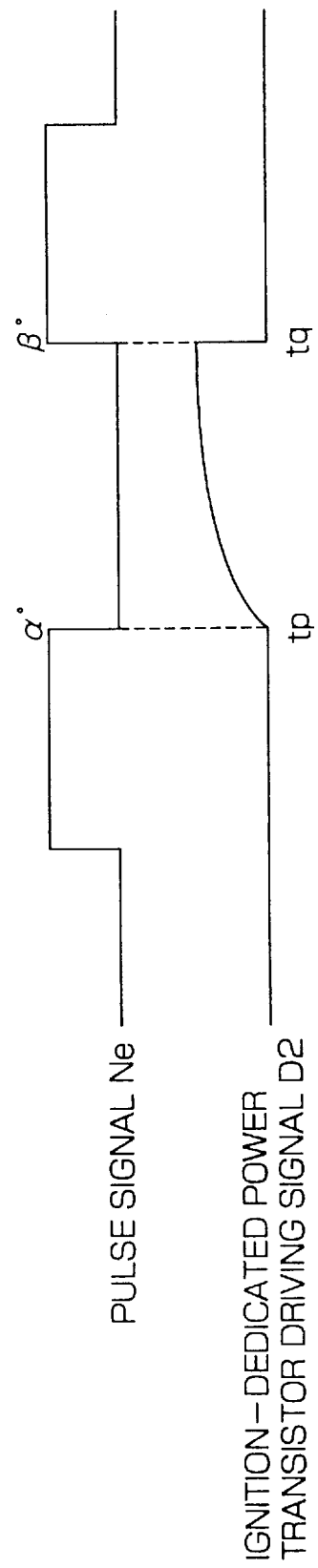
FIG. 12 is a timing chart for illustrating a relation between the pulse signal Ne and an ignition-dedicated power transistor driving signal.
Figure 13:
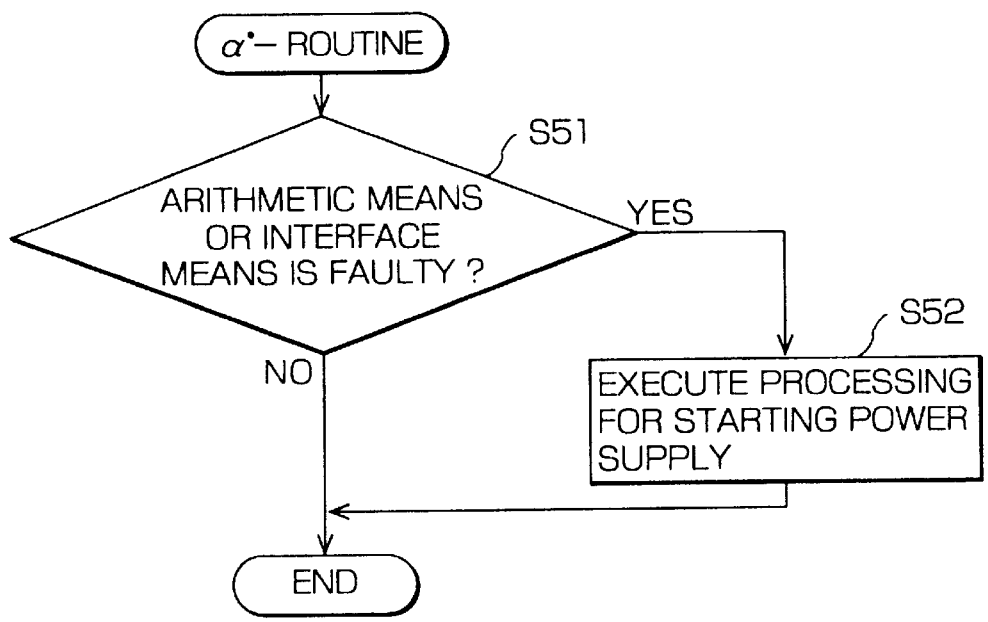
FIG. 13 is a flow chart for illustrating a processing routine executed by the driving means at every crank angle $\alpha°$.
Figure 14:
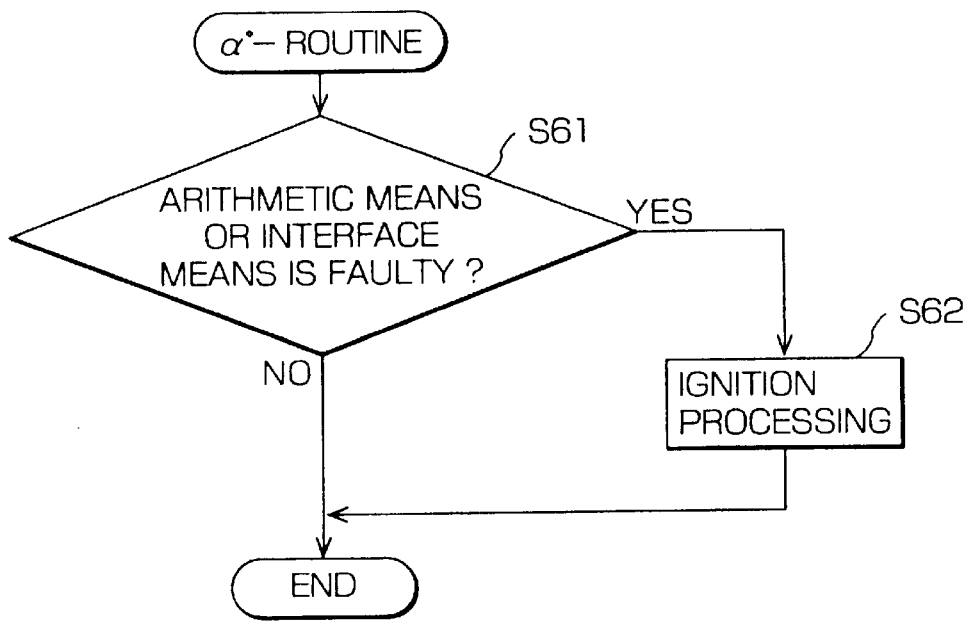
FIG. 14 is a flow chart for illustrating a processing routine executed by the driving means at every crank angle $\beta°$.
Figure 15:
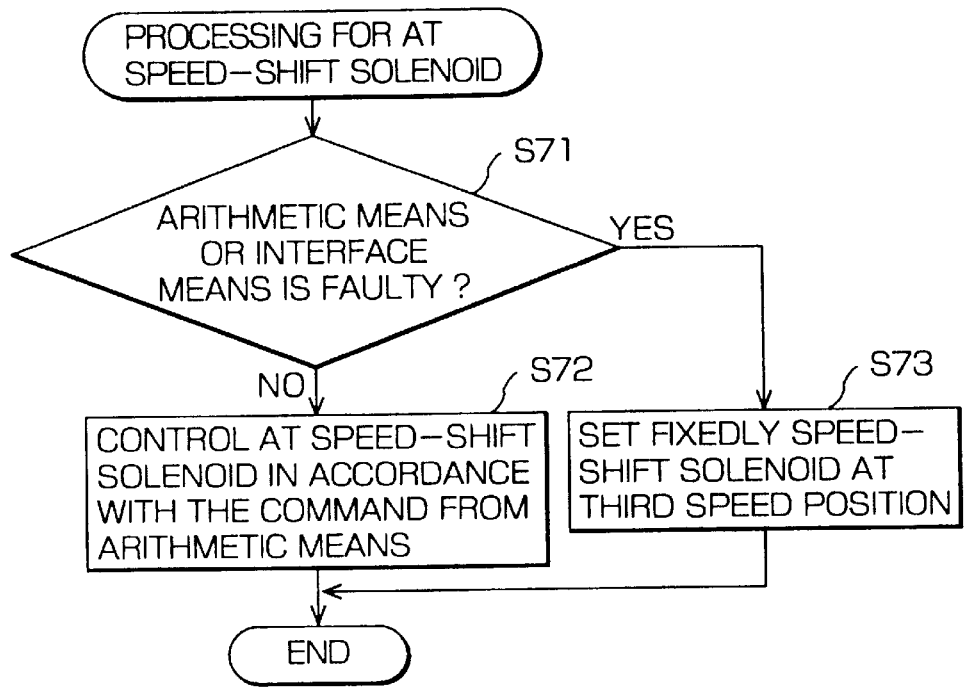
FIG. 15 is a flow chart for illustrating a processing routine for controlling an automatic transmission (AT) speed-shift solenoid as executed by the microcomputer of the driving means.
Figure 16:
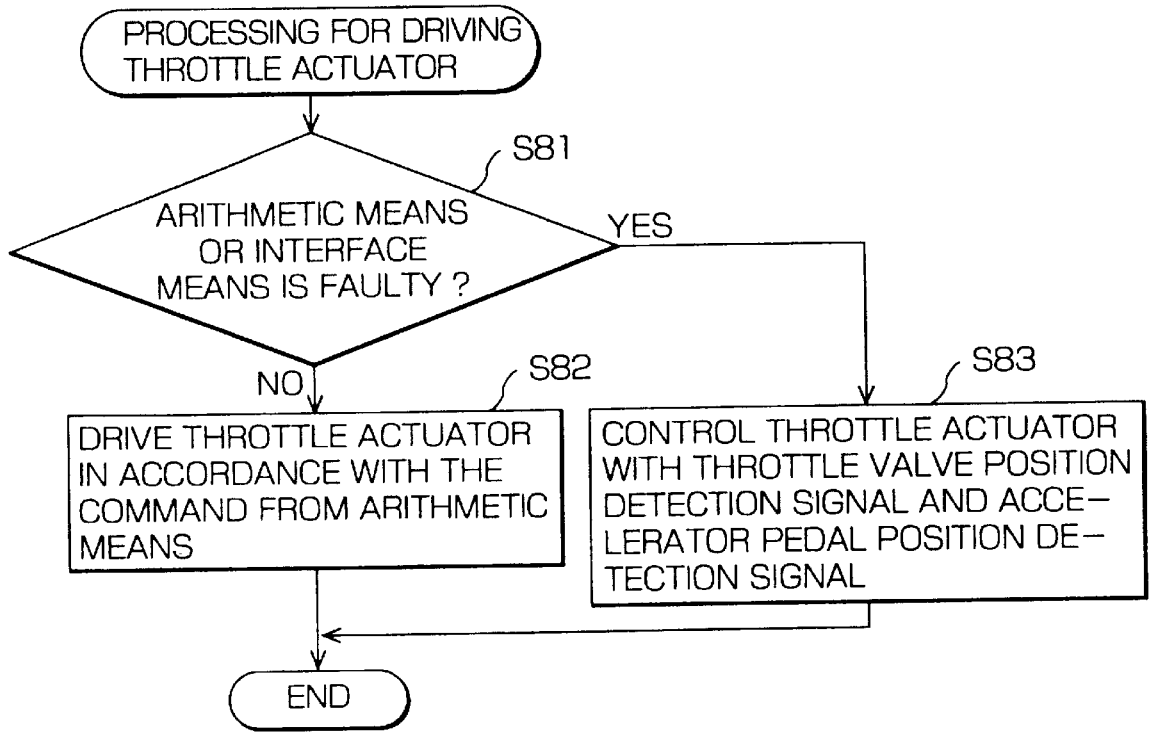
FIG. 16 is a flow chart for illustrating a processing routine for a throttle actuator executed by the microcomputer of the driving means.

Next, the referring to FIGS. 12 to 14, description will turn to the driving control operation in driving the ignition-dedicated power transistor 1052 as performed by the driving means 302 in response to detection of a fault in the arithmetic means 301 or the interface means 103.

FIG. 12 is a timing chart illustrating a relation between the pulse signal Ne and the ignition-dedicated power transistor driving signal D2.

Further, FIG. 13 is a flow chart for illustrating a processing routine executed by the driving means 302 at every crank angle α°, and FIG. 14 is a flow chart for illustrating a processing routine executed by the driving means 302 at every crank angle β°. In FIGS. 13 and 14, steps S51 and S61 correspond, respectively, to the fault decision steps S31 and S41 mentioned previously.

Referring to FIG. 13, when a decision is made in the step S51 that the arithmetic means 301 or the interface means 103 suffers from a fault, the driving means 302 starts electric power supply to the ignition-dedicated power transistor 1052 in a step S52 at a timing $t_p$ corresponding to the crank angle α° determined on the basis of the pulse signal Ne (refer to FIG. 12).

Further referring to FIG. 14, every time a fault in the arithmetic means 301 or the interface means 103 is detected in the step S61, the driving means 302 cuts electric power supply to the ignition-dedicated power transistor 1052 in a step S62 at a timing $t_q$ corresponding to the crank angle β° determined on the basis of the pulse signal Ne, to thereby perform an ignition processing (refer to FIG. 12).

Next, description will be directed to the driving control operation for the automatic transmission (AT) speed-shift solenoid 1053 by the driving means 302 upon occurrence of a fault in the arithmetic means 301 or the interface means 103.

In the drawings mentioned above, FIG. 15 is a flow chart for illustrating a processing routine for the automatic transmission (AT) speed-shift solenoid 1053 executed by the microcomputer 302C of the driving means 302, wherein a step S71 corresponds to the fault decision step S31 mentioned previously.

The driving means 302 makes a decision as to presence or absence of a fault in the arithmetic means 301 or the interface means 103 (step S71). When a decision is made that the arithmetic means 301 or the interface means 103 is normal (i.e., when the result of the step S71 is negative "NO"), the driving means 302 generates a speed-shift solenoid driving signal D3 for the automatic transmission (AT) speed-shift solenoid 1053 in accordance with the desired speed-shift position issued from the arithmetic means 301, whereby the automatic transmission (AT) speed-shift solenoid 1053 is driven in a step S72.

By contrast, upon detection of a fault in the arithmetic means 301 or the interface means 103 in the step S71 (i.e., when the answer of the decision step S71 is "YES"), the driving means 302 performs a processing for setting fixedly the automatic transmission (AT) speed-shift solenoid 1053 at a middle speed position such as a third speed position (step S73).

In this manner, the running or driving function can be ensured for the automobile at a necessary minimum while avoiding an erroneous speed setting.

Next, a description will be directed to the driving control operation for the throttle actuator 1054 performed by the driving means 302 upon occurrence of a fault in the arithmetic means 301 or the interface means 103.

In the drawings mentioned above, FIG. 16 is a flow chart for illustrating a processing routine for the throttle actuator 1054 executed by the microcomputer 302C of the driving means 302, wherein a step S81 corresponds to the fault decision step S31 mentioned previously.

The driving means 302 makes a decision as to the presence or absence of a fault in the arithmetic means 301 or the interface means 103 (step S81). When a decision is made that the arithmetic means 301 or the interface means 103 is normal (i.e., when the result of the step S81 is negative "NO"), the throttle actuator 1054 is driven in accordance with the desired throttle valve opening degree issued from the arithmetic means 301 (step S82).

On the contrary, when it is decided in the step S81 that the arithmetic means 301 or the interface means 103 suffers from a fault (i.e., when the decision step S81 results in "YES"), the driving means 302 generates a throttle actuator driving signal D4 for the throttle actuator 1054 in accordance with the accelerator pedal position detection signal A and the throttle valve position detection signal θ to thereby effectuate a feedback control for the throttle opening in a step S83.

As will now be understood from the forgoing, when a fault occurs in the arithmetic means 301 or the interface means 103, the driving means 302 detects the fault to thereby arithmetically determine the control quantities for the individual actuators 1051 to 1054 on the basis of the accelerator pedal position detection signal A, the throttle valve position detection signal θ, the pulse signal Ne and the engine cylinder identifying signal SGC, respectively, which are indispensably required at least for driving or operating the automobile. In other words, even when a fault occurs in the arithmetic means 301 or the interface means 103, backup operation for driving or operating the automobile can be ensured at least to a necessary minimum only by means of the driving means 302.

Figure 17:
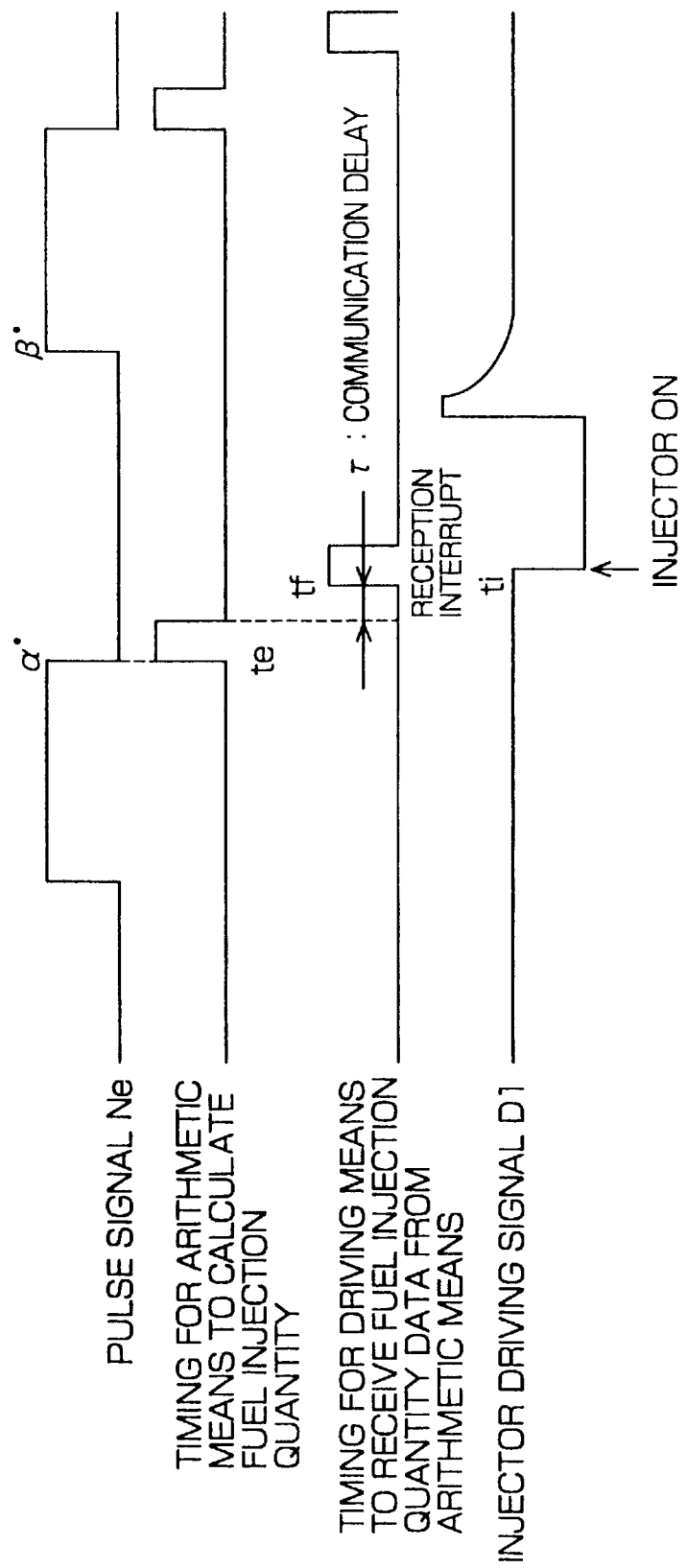
FIG. 17 is a timing chart for illustrating a relation between a timing for calculating the fuel injection quantity and a timing for driving a fuel injector in the synthetic automobile control system according to the first embodiment of the invention.

Next, a description will be made of the fuel injection control when the automobile system operates normally by reference to FIGS. 17 to 19, in which FIG. 17 is a timing chart for illustrating a relation between a timing for calculating the fuel injection quantity and a timing for driving the fuel injector 1051 in the synthetic automobile control system according to the instant embodiment of the invention. More specifically, FIG. 17 shows a timing for sending out the fuel injection quantity data (control quantity) to be supplied from the arithmetic means 301 to the driving means 302 when the multiplex communication function of the interface means 103 is normal.

Figure 18:
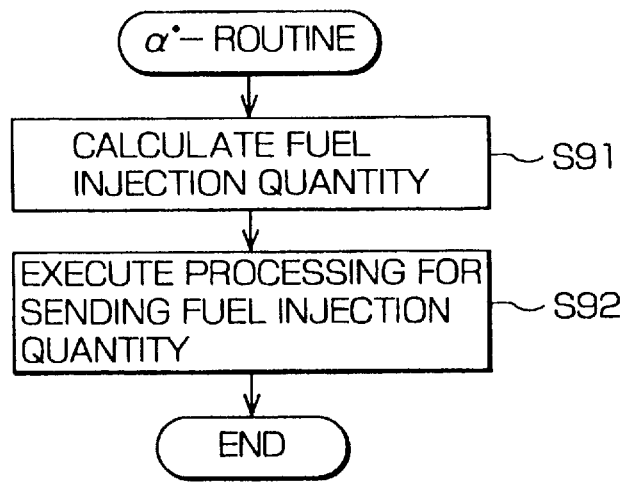
FIG. 18 is a flow chart illustrating an interrupt processing for determining arithmetically or calculating a fuel injection quantity by the arithmetic means.
Figure 19:
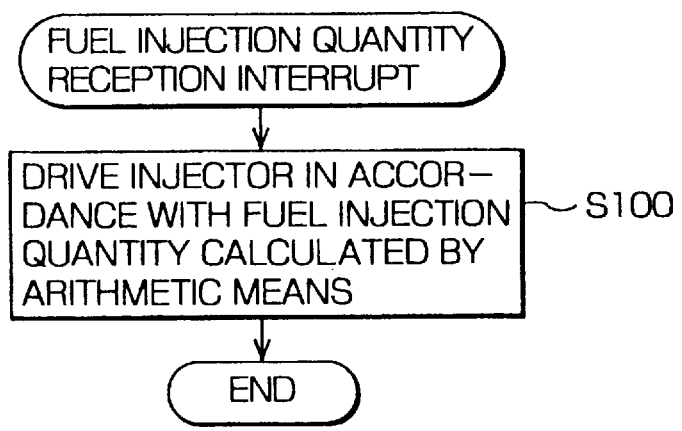
FIG. 19 is a flow chart illustrating an interrupt processing routine for driving a fuel injector as executed by the driving means upon reception of a fuel injection quantity signal.

Furthermore, FIG. 18 is a flow chart illustrating an interrupt processing routine for determining arithmetically or calculating the fuel injection quantity by the arithmetic means 301, and FIG. 19 is a flow chart illustrating an interrupt processing routine for driving the fuel injector 1051 as executed by the driving means 302 upon reception of the fuel injection quantity signal mentioned previously.

Referring to FIG. 18, in a step S91, the arithmetic means 301 arithmetically determines at first the fuel injection quantity at a timing $t_e$ (see FIG. 17) corresponding to the crank angle $\alpha°$ designated by the pulse signal Ne (i.e., engine rotation speed signal) on the basis of the sensor signals generated by the various sensors 104.

In succession, the arithmetic means 301 transmits immediately the fuel injection quantity data as calculated to the driving means 302 by making use of the multiplex communication effected via the interface means 103 which is assumed as operating normally (step S92).

When the driving means 302 receives the fuel injection quantity data from the arithmetic means 301 at a time point or timing $t_f$ (see FIG. 17) with a delay $\tau$ through multiplex communication via the interface means 103, the driving means 302 performs instantaneously the processing for driving the fuel injector 1051 at a time point or timing $t_i$ with the uppermost priority (step S100). By controlling the fuel injector 1051 by making use of the microcomputer via the interface means 103 in this manner, the time lag $\tau$ (see FIG. 17) involved in the communication between the arithmetic means 301 and the driving means 302 can be suppressed to a minimum.

Figure 20:
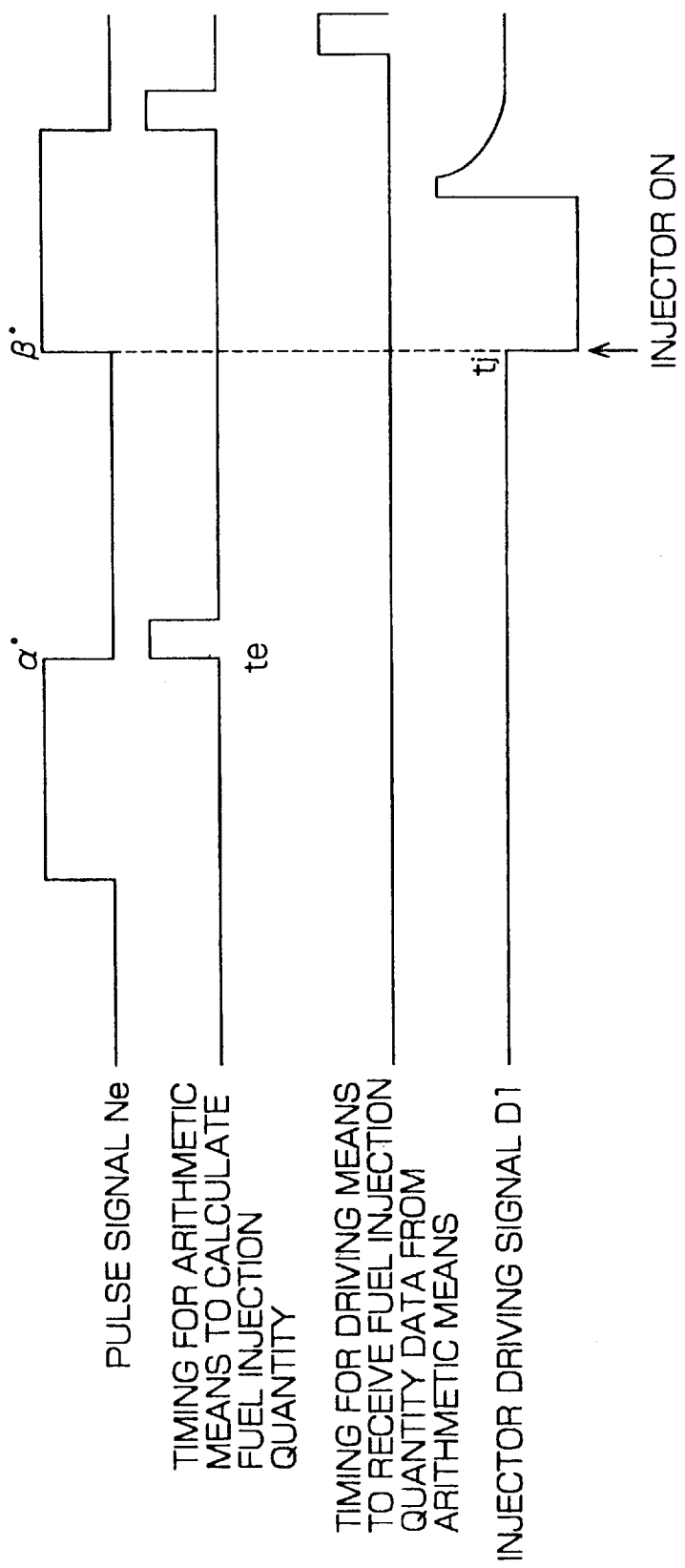
FIG. 20 is a timing chart for illustrating timings for arithmetic determination of a fuel injection quantity when a communication error takes place and for driving the fuel injector, respectively.
Figure 21:
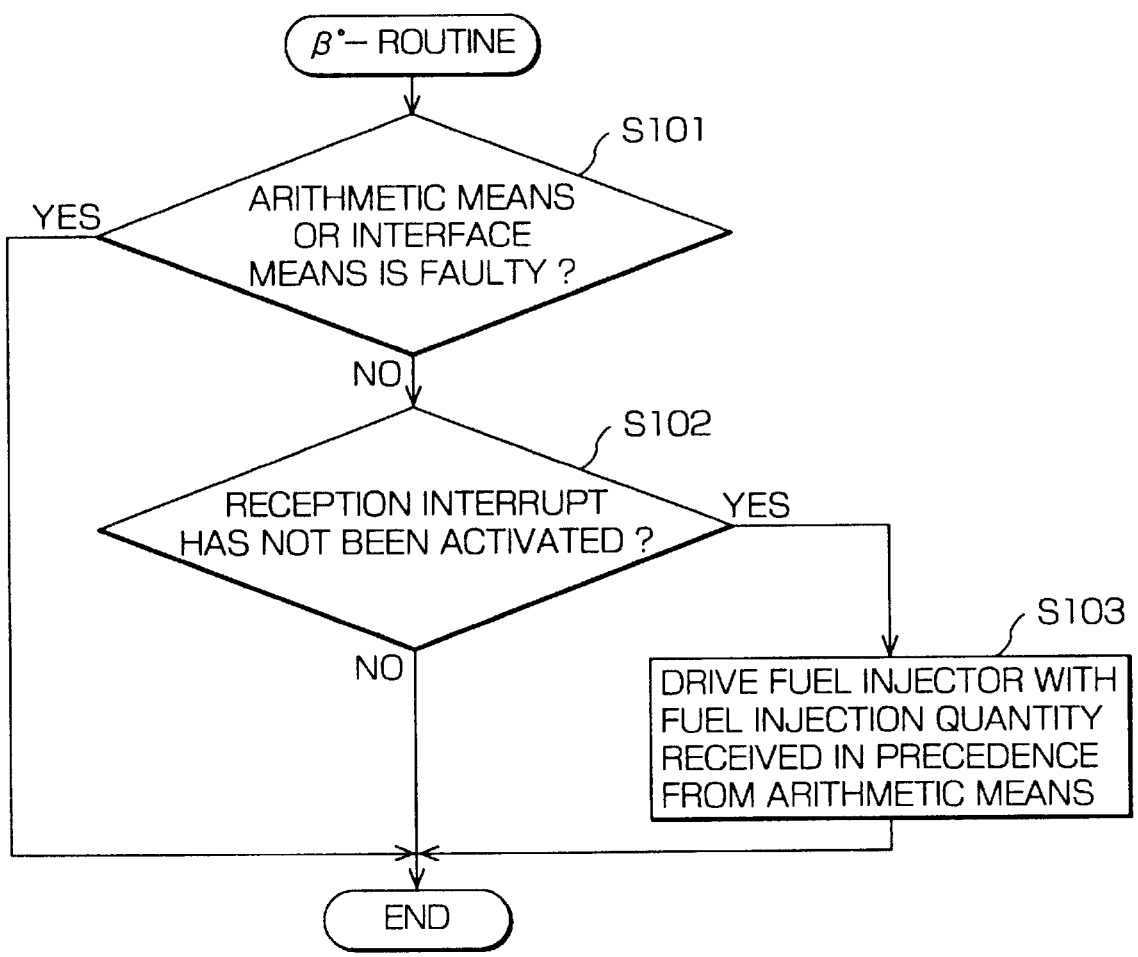
FIG. 21 is a flow chart illustrating an interrupt processing routine for driving the fuel injector.

Next, referring to FIGS. 20 and 21, description will be made of the operation timing of the fuel injector 1051 upon occurrence of a communication error in the synthetic automobile control system according to the instant embodiment of the invention. In the drawings mentioned above, FIG. 20 is a timing chart for illustrating timings (time points) for arithmetic determination or calculation of the fuel injection quantity when a communication error takes place and for driving the fuel injector 1051, and FIG. 21 is a flow chart illustrating an interrupt processing routine for driving the fuel injector 1051. Parenthetically, the processing routine executed by the arithmetic means 301 is same as that shown in FIG. 18.

At first, the arithmetic means 301 arithmetically determines or calculates the fuel injection quantity at a timing $t_e$ (see FIG. 20) corresponding to the crank angle $\alpha°$ determined on the basis of the pulse signal Ne, to send out immediately the fuel injection quantity as determined. At this juncture, it should however be mentioned that unless the driving means 302 have received the fuel injection quantity data from the arithmetic means 301 due to occurrence of any other communication error than a fault, the driving means 302 then executes a $\beta°$-interrupt processing routine, as shown in FIG. 21.

Referring to FIG. 21, the driving means 302 makes a decision as to whether the arithmetic means 301 or the interface means 103 suffers from a fault or not (step S101). When the presence of fault is decided (i.e., when the answer of the step S101 is "YES"), the fault processing routine mentioned previously is executed. Unless the fault is detected (i.e., when the step S101 results in "NO"), a decision is then made as to whether the reception interrupt has not been activated up to the input timing (equivalent to the crank angle $\beta°$) of the pulse signal Ne succeeding immediately to the timing for calculation (equivalent to the crank angle $\alpha°$) of the fuel injection quantity (step S102).

When it is decided that the driving means 302 has not received the fuel injection quantity data from the arithmetic means 301 until the time point corresponding to the crank angle $\beta°$ succeeding to the crank angle $\alpha°$ (i.e., when the step S102 results in "YES"), the driving means 302 performs the processing for driving the fuel injector 1051 at a timing $t_j$ corresponding to the crank angle $\beta 20$ (see FIG. 20) by using the fuel injection quantity data received in precedence from the arithmetic means 301 (step S103).

In this manner, by conducting the fuel injection control at the timing $t_j$ corresponding to the succeeding crank angle $\beta°$ even when error takes place in the communication, an unwanted situation wherein the fuel injection is not performed can be avoided even though a timing for driving the fuel injector 1051 is accompanied with a time lag or delay relative to the timing $t_i$ mentioned previously by reference to FIG. 17.

Next, a referring to FIGS. 22 to 24, description will be made of the knock correcting operation for the ignition timing in the synthetic automobile control system according to the instant embodiment of the invention. In this conjunction, it is presumed that the arithmetic means 301 is equipped with a means for detecting the generation of the knock in the internal combustion engine.

Figure 22:
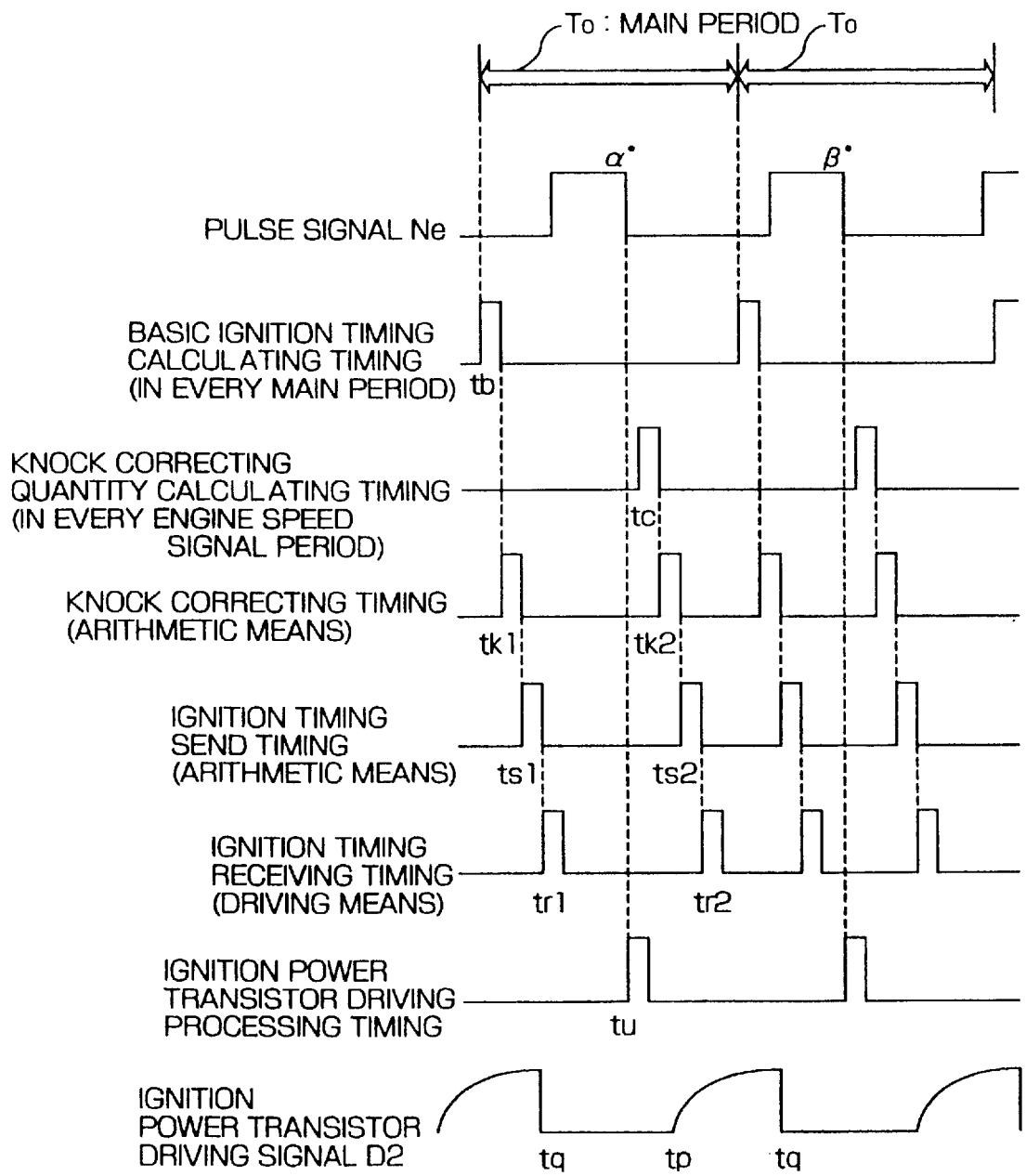
FIG. 22 is a timing chart for illustrating an ignition control operation according to the first embodiment of the invention.
Figure 23:
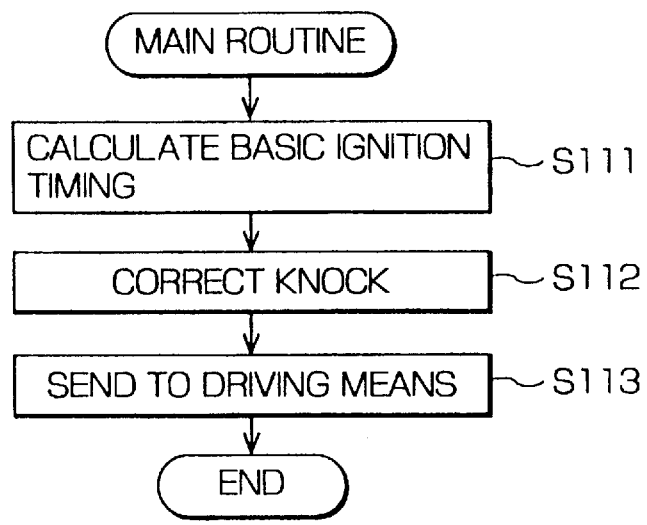
FIG. 23 is a flow chart showing a main processing routine of an ignition control program as executed by the arithmetic means.
Figure 24:
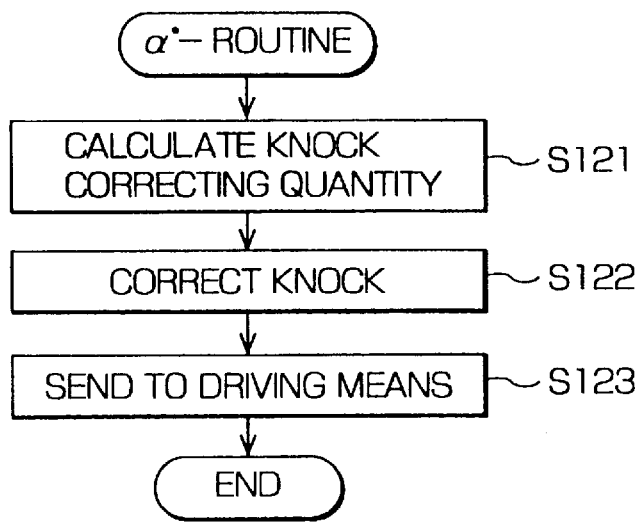
FIG. 24 is a flow chart showing an interrupt processing routine executed by the arithmetic means at every crank angle $\alpha°$.

In the drawings mentioned above, FIG. 22 is a timing chart for illustrating an ignition control operation according to the instant embodiment of the invention, FIG. 23 is a flow chart showing a main processing routine of an ignition control program to be executed by the arithmetic means 301 and FIG. 24 is a flow chart showing an interrupt processing routine executed by the arithmetic means 301 at every crank angle $\alpha°$.

In the main processing routine illustrated in FIG. 23, the arithmetic means 301 determines arithmetically the basic ignition timing at the timing point $t_b$ (see FIG. 22) in every main period To (step S111), while in the interrupt processing routine shown in FIG. 24, the arithmetic means 301 calculates the knock correcting quantity at the timing $t_c$ (see FIG. 22) at every crank angle $\alpha°$ indicated by the pulse signal Ne (step S121).

In the main processing routine illustrated in FIG. 23, the arithmetic means 301 corrects the knock in a step S112 at a time point $t_{k1}$ (see FIG. 22) immediately after the arithmetic means 301 has determined arithmetically the basic ignition timing in every main period $T_o$ (step S111), while in the interrupt processing routine shown in FIG. 24, the arithmetic means 301 corrects the knock at the ignition timing at the timing $t_{k2}$ (step S122) immediately after the arithmetic means 301 has calculated the knock correcting quantity.

After executions of the knock correcting steps S112 and S122, at the timings $t_{s1}$ and $t_{s2}$ immediately succeeding these steps, the arithmetic means 301 sends the ignition timing data to the driving means 302 through multiplex communication via the interface means 103 (steps S113 and S123).

The driving means 302 executes the processing for driving (turning on) the ignition-dedicated power transistor 1052 at the timing $t_u$ corresponding to the crank angle $\alpha°$ indicated by the pulse signal Ne in accordance with the ignition timing information supplied from the arithmetic means 301 to thereby start power supply through the power transistor 1052 for generating the ignition spark at a timing $t_p$, while turning off the ignition-dedicated power transistor 1052 at a timing $t_q$.

By virtue of the ignition control described above, the influence due to a lag or delay involved in the communication can be suppressed to a minimum.

Embodiment 2

In the case of the synthetic automobile control system according to the first embodiment of the invention, the fuel injector 1051 is driven after activation of the reception interrupt for the fuel injection quantity from the arithmetic means 301 to the driving means 302, as is shown in FIG. 17, wherein driving operation for the fuel injector 1051 is controlled during the microcomputer interrupt is validated. However, the fuel injector 1051 may be driven before the command for effectuating the fuel injector quantity reception interrupt is issued.

Figure 25:
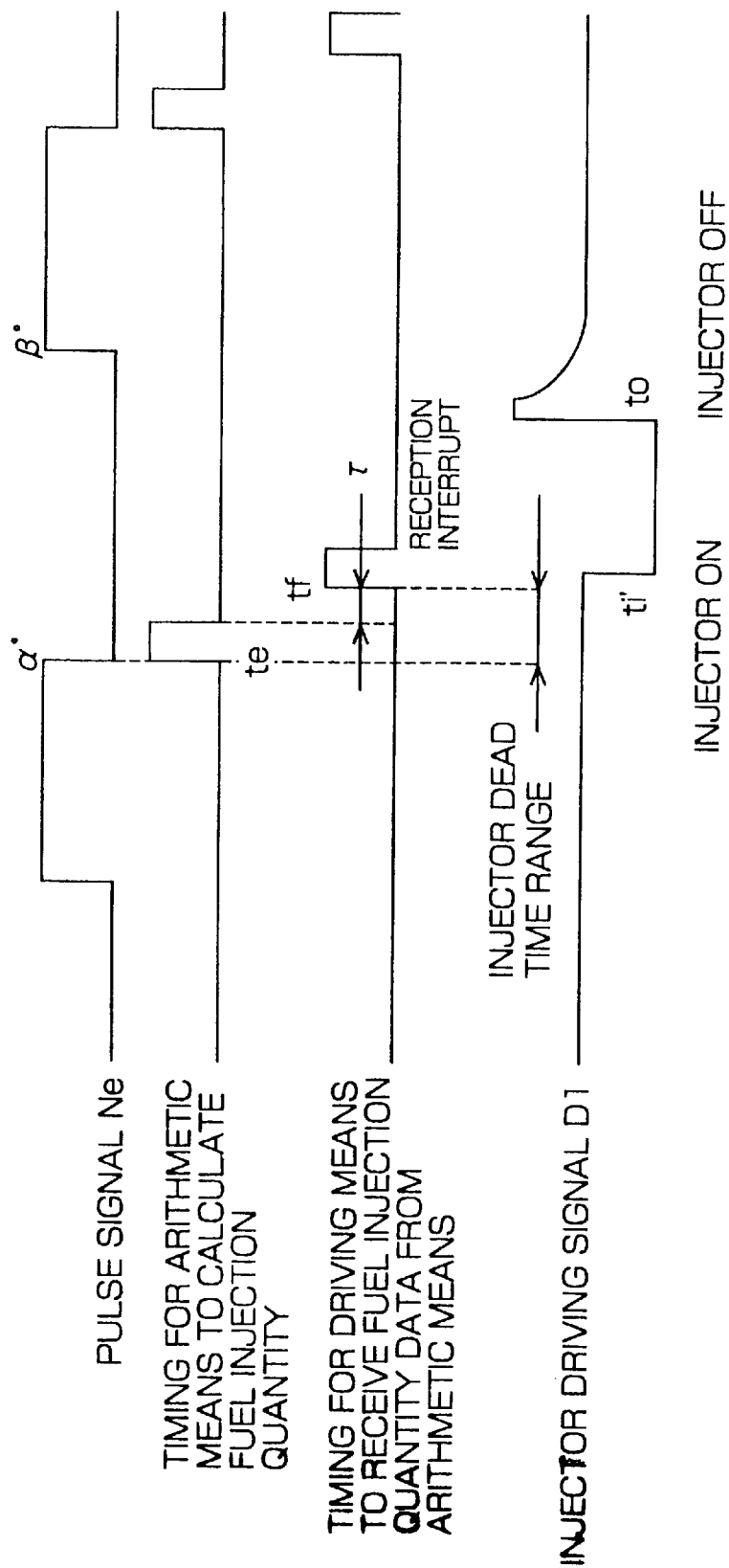
FIG. 25 is a flow chart for illustrating a fuel injection control operation according to a second embodiment of the present invention.
Figure 26:
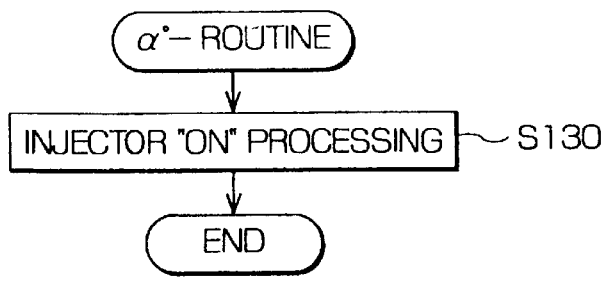
FIG. 26 is a flow chart for illustrating an interrupt processing routine executed at every crank angle $\alpha°$ for the driving means.
Figure 27:
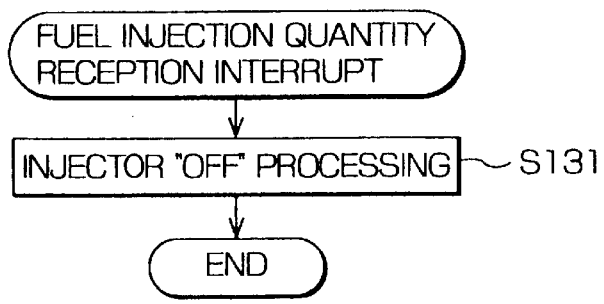
FIG. 27 is a flow chart for illustrating a reception interrupt processing routine for the driving means.
Figure 28:
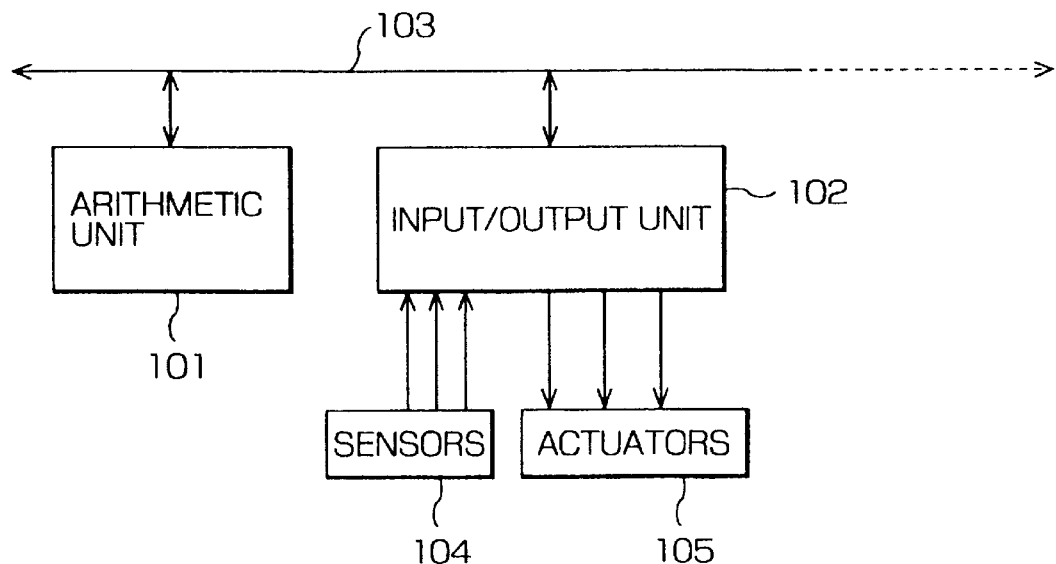
FIG. 28 is a schematic block diagram showing a major portion of an input/output unit of a conventional synthetic automobile control system known heretofore.
Figure 29:
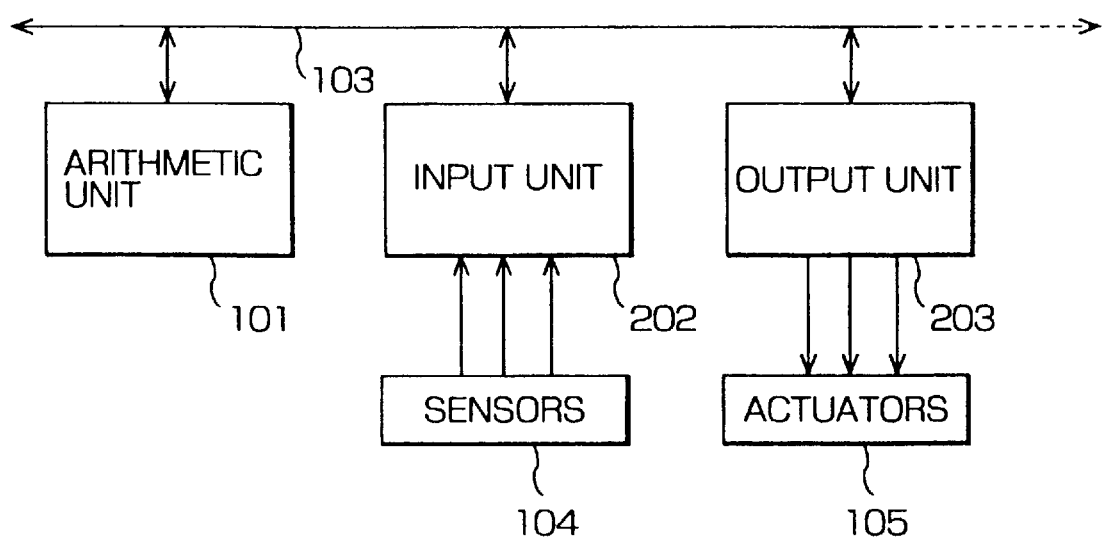
FIG. 29 is a schematic block diagram showing configurations of another conventional synthetic automobile control system in which an input unit and an output unit are provided separately from each other.
Figure 30:
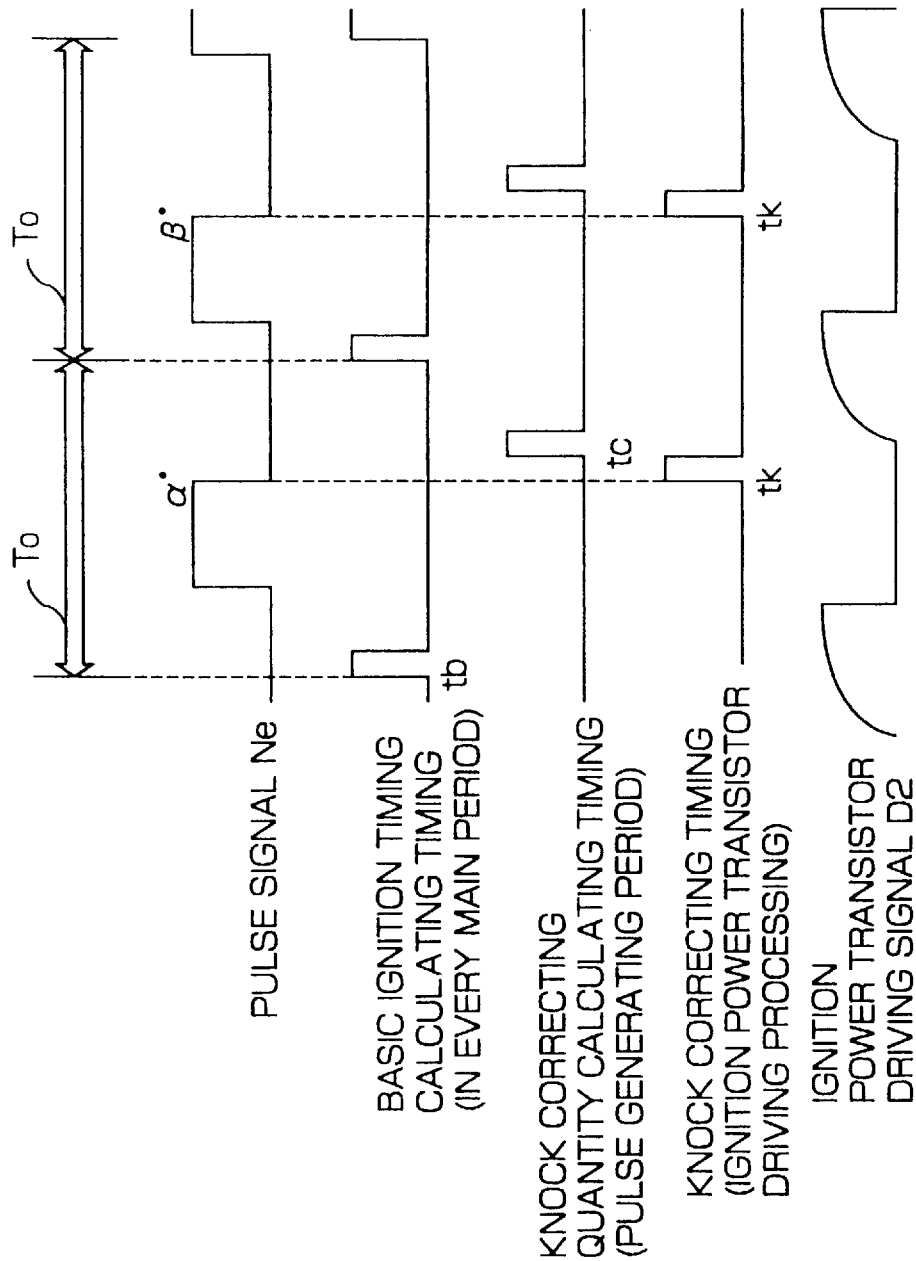
FIG. 30 is a timing chart for illustrating ignition timing control operation of an arithmetic unit and an input/output unit implemented in an integrated structure and having a knock (or knocking) suppressing function.

FIG. 25 is a flow chart for illustrating a fuel injection control operation according to a second embodiment of the present invention, FIG. 26 is a flow chart for illustrating an interrupt processing routine executed at every crank angle $\alpha°$ for the driving means 302 and FIG. 27 is a flow chart for illustrating a reception interrupt processing routine for the driving means 302.

Referring to FIG. 26, the driving means 302 is adapted to drive the fuel injector 1051 at a timing $t_i$ (see FIG. 25) corresponding to the crank angle $\alpha°$ indicated by the pulse signal Ne (step S130).

In succession, the driving means 302 turns off the fuel injector 1051 at a timing to (see FIG. 25) in response to activation of a fuel injection quantity reception interrupt, as shown in FIG. 22, in a step S131.

In this conjunction, it goes without saying that the turn-off timing for the fuel injector 1051 is controlled in accordance with the fuel injection quantity received from the arithmetic means 301. Further, when the fuel injection quantity is zero, the fuel injector 1051 is controlled to be off immediately after validation of the reception interrupt so that the fuel is not actually injected.

In this manner, delay τ involved in the communication between the arithmetic means 301 and the driving means 302 can utterly be neglected with the delay time being reduced to zero.

However, the timing $t_i'$ for turning on (or stating) the fuel injector 1051 has to be so selected that the time intervening between the turning-on of the fuel injector 1051 and the turning-off thereof falls within a rage of a dead time (i.e., time for which the fuel injector 1051 does not operate) in order to cope with the situation where the fuel injection quantity becomes zero.

As will now be understood from the foregoing description, because the input processing means designed for performing the input processing of the various sensor signals is incorporated in the arithmetic means 301 for inputting directly or straightforwardly the various sensor signals into the arithmetic means 301, it is no more required to provide the input processing means internally of the driving means 302 so far as the arithmetic means 301 and the interface means 103 operate normally, which in turn means that not only the provision for coping with the noise and heat is rendered unnecessary but also miniaturization of the apparatus can be realized.

Further, by incorporating the microcomputer 302C in the driving means 302 for performing the input processing of the necessary minimum number of the sensor signals together with the means for detecting the occurrence of a fault in the arithmetic means 301 or the interface means 103 for driving the actuators only by means of the driving means 302 upon detection of a fault occurrence, there can be realized the backup driving operation for the automobile system, which is thus protected against the incapability of running while being ensured with a driving capability or manipulation at a necessary minimum.

Furthermore, by using the microcomputer means such as a LAN (Local Area Network) or the like as the interface means 103, expansion of the automobile system can be facilitated. Besides, owing to the reception interrupt for the microcomputer, various actuators can controllably be driven.

Moreover, because the ignition control data which has to be processed at a highest rate or immediately among others is sent to the arithmetic means for correcting the ignition timing and the driving means 302 upon every arithmetic determination of the basic ignition timing in the main period $T_0$ and upon every calculation of the knock correcting quantity through the interrupt processing, the influence of the delay or lag τ in the communication between the arithmetic means 301 and the driving means 302 can be suppressed to a minimum.

In addition, since the driving of the fuel injector 1051 is controlled by making use of the fuel injection quantity supplied in precedence in case the fuel injection quantity can not be obtained over a predetermined time span, there can be ensured or sustained a necessary minimum driving capability for the automobile system even when other communication errors than the fault should take place.

Many modifications and variations of the present invention are possible in the light of the above techniques. It is therefore to be understood that within the scope of the appended claims, the invention may be practiced otherwise than as specifically described.

What is claimed is:

1. A synthetic control system for an automobile, comprising:

a plurality of actuators for operating/driving an automobile;

a plurality of sensors for generating a variety of sensor signals indicating operation states of said automobile;

arithmetic means including a microcomputer for arithmetically determining control quantities for said plurality of actuators on the basis of said variety of sensor signals;

driving means for driving said plurality of actuators in accordance with said control quantities, respectively; and interface means for coupling said arithmetic means and said driving means to each other;

said actuators including at least one of a fuel injector and an ignition unit provided in association with each of engine cylinders of an internal combustion engine of said automobile;

said control quantities including at least one of a fuel injection quantity and an ignition timing for each of said engine cylinders;

said driving means being adapted for driving at least one of said fuel injector and said ignition unit on the basis of said control quantities;

wherein said variety of sensor signals are inputted to said arithmetic means, and wherein said microcomputer incorporated in said arithmetic means includes an input signal processing means for performing input processing for said variety of sensor signals;

said interface means comprising multiplex communication means;

wherein said arithmetic means transmits said control quantities to said driving means by using said multiplex communication means, while said driving means controls operation of said actuators response to a fault by said multiplex communication means.

2. A synthetic control system for an automobile according to claim 1, wherein said driving means is adapted to drive said fuel injector in precedence to transmission of a signal indicative of said fuel injection quantity and intercept operation of said fuel injector in response to a fault of said fuel injection quantity signal sent from said arithmetic means.

3. A synthetic control system for an automobile according to claim 1, said arithmetic means including:
means for arithmetically determining a basic ignition timing for said ignition timing through a main processing routine executed periodically at a predetermined time interval;
means for detecting occurrence of knock in an internal combustion engine of the automobile; and
means for arithmetically determining a knock correcting quantity for correcting said ignition timing in response to detection of said knock through an interrupt processing routine;
wherein a corrected ignition timing obtained by correcting said basic ignition timing with said knock correcting quantity is transmitted to said driving means as one of said control quantities every time said basic ignition timing is arithmetically determined; and
wherein a corrected ignition timing obtained by correcting said basic ignition timing by said knock correcting quantity is sent to said driving means as one of said control quantities every time said knock correcting quantity is arithmetically determined.

4. A synthetic control system for an automobile according to claim 1, wherein said driving means is adapted to control operation of said fuel injector by using a fuel injection quantity supplied in precedence from said arithmetic means unless said fuel injection quantity has been sent from said arithmetic means over a predetermined time period.

5. A synthetic control system for an automobile, comprising:

a plurality of actuators for operating/driving an automobile;

a plurality of sensors for generating a variety of sensor signals indicating operation states of said automobile;

arithmetic means including a microcomputer for arithmetically determining control quantities for said plurality of actuators on the basis of said variety of sensor signals;

driving means for driving said plurality of actuators in accordance with said control quantities, respectively; and interface means for coupling said arithmetic means and said driving means to each other;

said actuators including at least one of a fuel injector and an ignition unit provided in association with each of engine cylinders of an internal combustion engine of said automobile;

said control quantities including at least one of a fuel injection quantity and an ignition timing for each of said engine cylinders;

said driving means being adapted for driving at least one of said fuel injector and said ignition unit on the basis of said control quantities;

wherein said variety of sensor signals are inputted to said arithmetic means, and wherein said microcomputer incorporated in said arithmetic means includes an input signal processing means for performing input processing for said variety of sensor signals; and wherein a minimum number of said variety of sensor signals are required for driving a minimum number of actuators required for operating and driving said automobile are inputted to said driving means; and wherein said driving means incorporates a microcomputer which includes:
fault detecting means for detecting occurrence of a fault in at least one of said arithmetic means and said interface means;
input processing means for performing input processing of said minimum number of required sensor signals upon detection of said fault; and
arithmetic processing means for arithmetically determining control quantities for said minimum number of required actuators on the basis of said minimum number of required sensor signals.

6. A synthetic control system for an automobile according to claim 5, wherein said plurality of sensors includes:

a throttle position sensor for detecting a position of a throttle valve of said automobile;

an accelerator pedal position sensor for detecting a position of an accelerator pedal of said automobile;

a rotation speed sensor for detecting a rotation speed of said internal combustion engine of said automobile; and a crank angle sensor provided in association with each of said engine cylinders;

wherein said variety of sensor signals include:
a throttle position detection signal generated by said throttle position sensor;
an accelerator pedal position signal generated by said accelerator pedal position sensor;
a pulse signal generated by said rotation speed sensor in synchronism with rotation of said internal combustion engine; and
a cylinder identifying signal generated by said crank angle sensor; and
wherein said minimum number of required sensor signals includes:
said throttle position detection signal, said accelerator pedal position detection signal, said pulse signal and said cylinder identifying signal.

7. A synthetic control system for an automobile according to claim 5, wherein said fault detecting means includes:

means for generating watchdog data from the output of said arithmetic means;

means for comparing said watchdog data to be inputted to said driving means with a preceding value; and means for deciding a fault of said arithmetic means when a state in which result of comparison of the instant value of said watchdog data with said preceding value thereof is abnormal continues over a predetermined fault decision time period.

8. A synthetic control system for an automobile according to claim 5, wherein said fault detecting means includes means for deciding occurrence of a fault in said interface means when data inputted from said arithmetic means to said driving means through said interface means has not been obtained over a predetermined fault decision time period.

9. A synthetic control system for an automobile according to claim 5, said actuator including an automatic transmission speed-shift solenoid;

said arithmetic means determining arithmetically a control quantity for said automatic transmission speed-shift solenoid while performing the input processing for the sensor signals for controlling said automatic transmission;

wherein said driving means is adapted to drive said automatic transmission speed-shift solenoid on the basis of said control quantity sent from said arithmetic means while setting a speed shift stage of said automatic transmission substantially at a middle speed upon occurrence of a fault in at least one of said arithmetic means and said interface means.

10. A synthetic control system for an automobile according to claim 6, wherein said driving means is adapted to arithmetically determine said fuel injection quantity as one of said control quantities on the basis of said pulse signal and said throttle position detection signal upon detection of a fault in at least one of said arithmetic means and said interface means, to thereby control operation of said fuel injector at an input timing of said pulse signal on the basis of said fuel injection quantity while controlling operation of said ignition unit in synchronism with said pulse signal.

11. A synthetic control system for an automobile according to claim 6, said actuator including a throttle actuator for controlling an intake air flow of said internal combustion engine with an electric signal;

said arithmetic means determining arithmetically a desired opening degree of said throttle valve as the control quantity;

wherein said driving means is adapted to drive said throttle actuator on the basis of said desired opening degree supplied from said arithmetic means while arithmetically determining the desired opening degree of said throttle valve on the basis of said throttle position detection signal and said accelerator pedal position detection signal, to thereby drive said throttle actuator when a fault is detected in at least one of said arithmetic means and said interface means.

12. A synthetic control system for an automobile, comprising:

a plurality of actuators for operating/driving an automobile;

a plurality of sensors for generating a variety of sensor signals indicating operation states of said automobile;

an arithmetic controller including a microcomputer which arithmetically determines control quantities for said plurality of actuators on the basis of said variety of sensor signals;

a driver which drives said plurality of actuators in accordance with said control quantities, respectively; and an interface coupler which couples said arithmetic controller and said driver to each other;

said actuators including at least one of a fuel injector and an ignition unit provided in association with each of engine cylinders of an internal combustion engine of said automobile;

said control quantities including at least one of a fuel injection quantity and an ignition timing for each of said engine cylinders;

said driver being adapted to drive at least one of said fuel injector and said ignition unit on the basis of said control quantities;

wherein said variety of sensor signals are inputted to said arithmetic controller, and wherein said microcomputer incorporated in said arithmetic controller includes an input signal processor for performing input processing for said variety of sensor signals;

said interface coupler comprising a multiplex communication device;

wherein said arithmetic processor transmits said control quantities to said driver by using said multiplex communication device, while said driver controls operation of said actuators in response to a fault by said multiplex communication device.

13. A synthetic control system for an automobile, comprising:

a plurality of actuators for operating/driving an automobile;

a plurality of sensors for generating a variety of sensor signals indicating operation states of said automobile;

an arithmetic controller including a microcomputer which arithmetically determines control quantities for said plurality of actuators on the basis of said variety of sensor signals;

a driver which drives said plurality of actuators in accordance with said control quantities, respectively; and an interface coupler which couples said arithmetic controller and said driver to each other;

said actuators including at least one of a fuel injector and an ignition unit provided in association with each of engine cylinders of an internal combustion engine of said automobile;

said control quantities including at least one of a fuel injection quantity and an ignition timing for each of said engine cylinders;

said driver being adapted to drive at least one of said fuel injector and said ignition unit on the basis of said control quantities;

wherein said variety of sensor signals are inputted to said arithmetic controller, and wherein said microcomputer incorporated in said arithmetic controller includes an input signal processor for performing input processing for said variety of sensor signals; and wherein a minimum number of said variety of sensor signals are required for driving a minimum number of actuators required for operating and driving said automobile are inputted to said driver; and wherein said driver incorporates a microcomputer which includes:
   a fault detector which detects occurrence of a fault in at least one of said arithmetic controller and said interface coupler;
   an input processor for performing input processing of said minimum number of required sensor signals upon detection of said fault; and
   an arithmetic processor for arithmetically determining control quantities for said minimum number of required actuators on the basis of said minimum number of required sensor signals.

* * * * *